(12) United States Patent
Walker et al.

(10) Patent No.: US 6,835,223 B2
(45) Date of Patent: Dec. 28, 2004

(54) FUEL STORAGE AND DISPENSING SYSTEM

(75) Inventors: Glenn K. Walker, Springboro, OH (US); Rodger P. Grantham, Springfield, MO (US); Ken Allen, Spring Valley, OH (US)

(73) Assignee: Vapor Systems Technologies, Inc., Dayton, OH (US)

( * ) Notice: Subject to any disclaimer, the term of this patent is extended or adjusted under 35 U.S.C. 154(b) by 15 days.

(21) Appl. No.: 10/335,090

(22) Filed: Dec. 31, 2002

(65) Prior Publication Data

US 2003/0192429 A1 Oct. 16, 2003

Related U.S. Application Data

(60) Provisional application No. 60/354,703, filed on Feb. 6, 2002.

(51) Int. Cl.[7] .............................................. B01D 46/00
(52) U.S. Cl. ........................ 55/385.1; 141/44; 141/45; 141/55; 141/57; 141/59; 141/63
(58) Field of Search ........................ 55/385.1; 95/1, 95/19, 22, 45, 47, 54, 43, 50, 51; 96/7, 9, 8, 421, 417; 141/206, 44–45, 51–64

(56) References Cited

U.S. PATENT DOCUMENTS

| | | | | |
|---|---|---|---|---|
| 3,905,405 A | * | 9/1975 | Fowler et al. ............ | 141/46 |
| 4,310,033 A | * | 1/1982 | Deters ..................... | 141/44 |
| 5,035,271 A | * | 7/1991 | Carmack et al. ......... | 141/206 |
| 5,148,840 A | * | 9/1992 | Grantham ................ | 141/44 |
| 5,255,723 A | * | 10/1993 | Carmack et al. ......... | 141/206 |
| 5,280,814 A | * | 1/1994 | Stroh ...................... | 141/83 |
| 5,289,857 A | * | 3/1994 | Pyles ...................... | 141/59 |
| 5,299,605 A | * | 4/1994 | Bergamini et al. ....... | 141/59 |
| 5,301,721 A | * | 4/1994 | Hartmann ................ | 141/59 |
| 5,305,807 A | * | 4/1994 | Healy ..................... | 141/59 |
| 5,417,256 A | * | 5/1995 | Hartsell et al. .......... | 141/7 |
| 5,464,466 A | * | 11/1995 | Nanaji et al. ............ | 95/45 |
| 5,484,000 A | * | 1/1996 | Hasselmann .............. | 141/7 |
| 5,494,409 A | * | 2/1996 | Webb et al. .............. | 417/53 |
| 5,571,310 A | * | 11/1996 | Nanaji .................... | 96/4 |
| 5,592,979 A | * | 1/1997 | Payne et al. ............. | 141/59 |
| 5,678,614 A | * | 10/1997 | Grantham ................ | 141/59 |
| 5,720,325 A | * | 2/1998 | Grantham ................ | 141/59 |
| 5,850,857 A | * | 12/1998 | Simpson .................. | 141/59 |
| 5,913,343 A | * | 6/1999 | Andersson ............... | 141/59 |
| 5,944,067 A | * | 8/1999 | Andersson ............... | 141/59 |
| 5,985,002 A | * | 11/1999 | Grantham ................ | 95/47 |
| 6,095,204 A | * | 8/2000 | Healy ..................... | 141/59 |
| 6,293,996 B1 | * | 9/2001 | Grantham et al. ........ | 95/47 |
| 6,360,789 B2 | * | 3/2002 | Walker et al. ........... | 141/95 |
| 6,608,484 B2 | * | 8/2003 | Grantham et al. ....... | 324/464 |

* cited by examiner

*Primary Examiner*—Duane S. Smith
(74) *Attorney, Agent, or Firm*—Wood, Herron & Evans, LLP

(57) ABSTRACT

A fuel storage and dispensing system reduces the emission of harmful volatile organic compounds. The system includes at least one storage tank, an air exhaust port, at least one fuel dispenser, a fuel dispensing nozzle, a rigid, fuel dispensing spout, a boot, a pressure relief chamber, a filter system, and at least one pump. The rigid, fuel dispensing spout further defines a non-coaxial fuel tube. The boot is configured to maintain a sufficient level of vacuum within the fuel storage and dispensing system. The boot is further configured to prevent fresh air from entering the fuel dispensing nozzle. The system may further include a pressure relief chamber that is effective in compensating for high temperature pressure build up in a vapor assist hose, a fuel dispensing nozzle and spout assembly, a vapor recovery boot assembly, and a Venturi shut-off assembly for a fuel dispensing nozzle and spout.

15 Claims, 14 Drawing Sheets

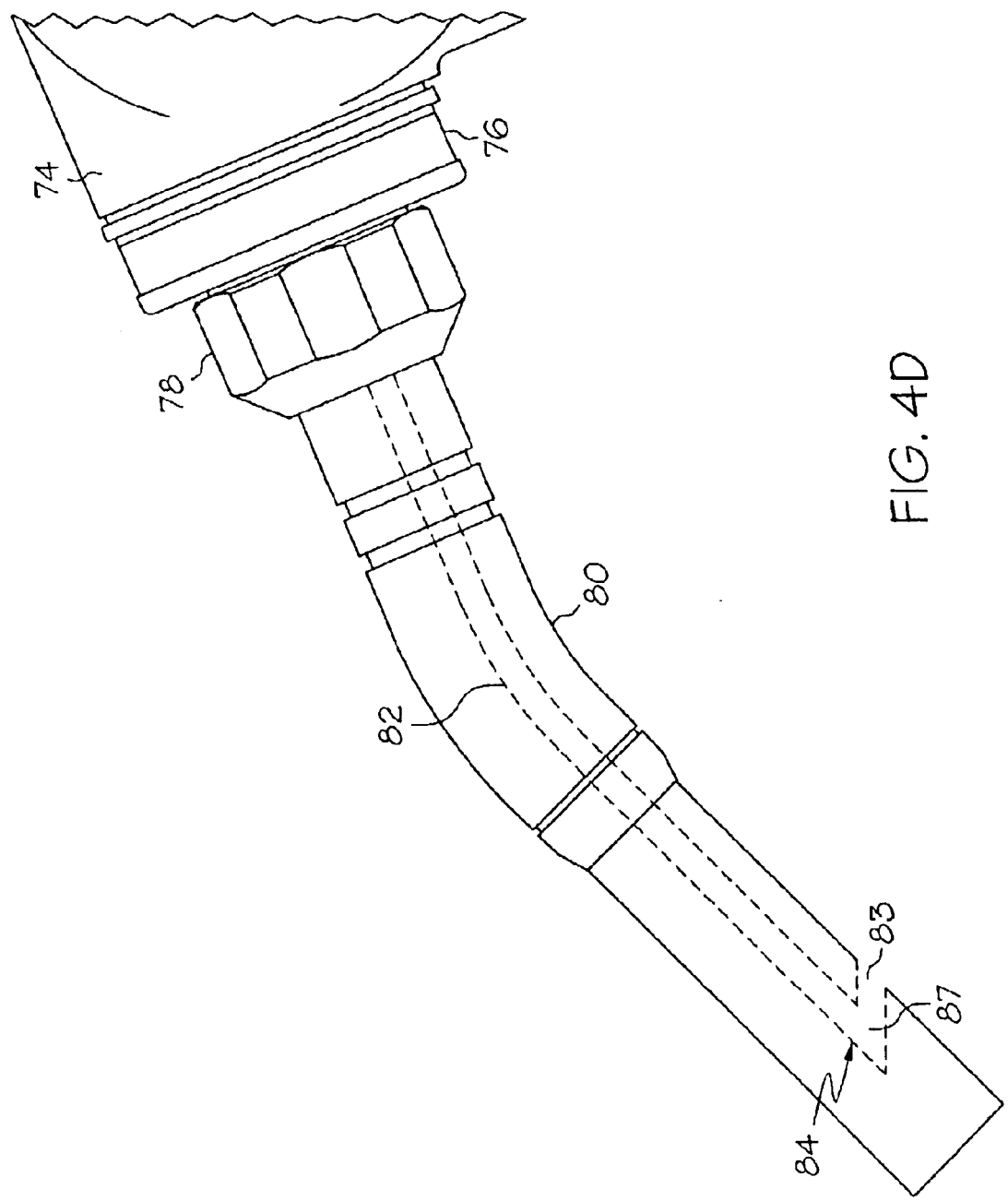

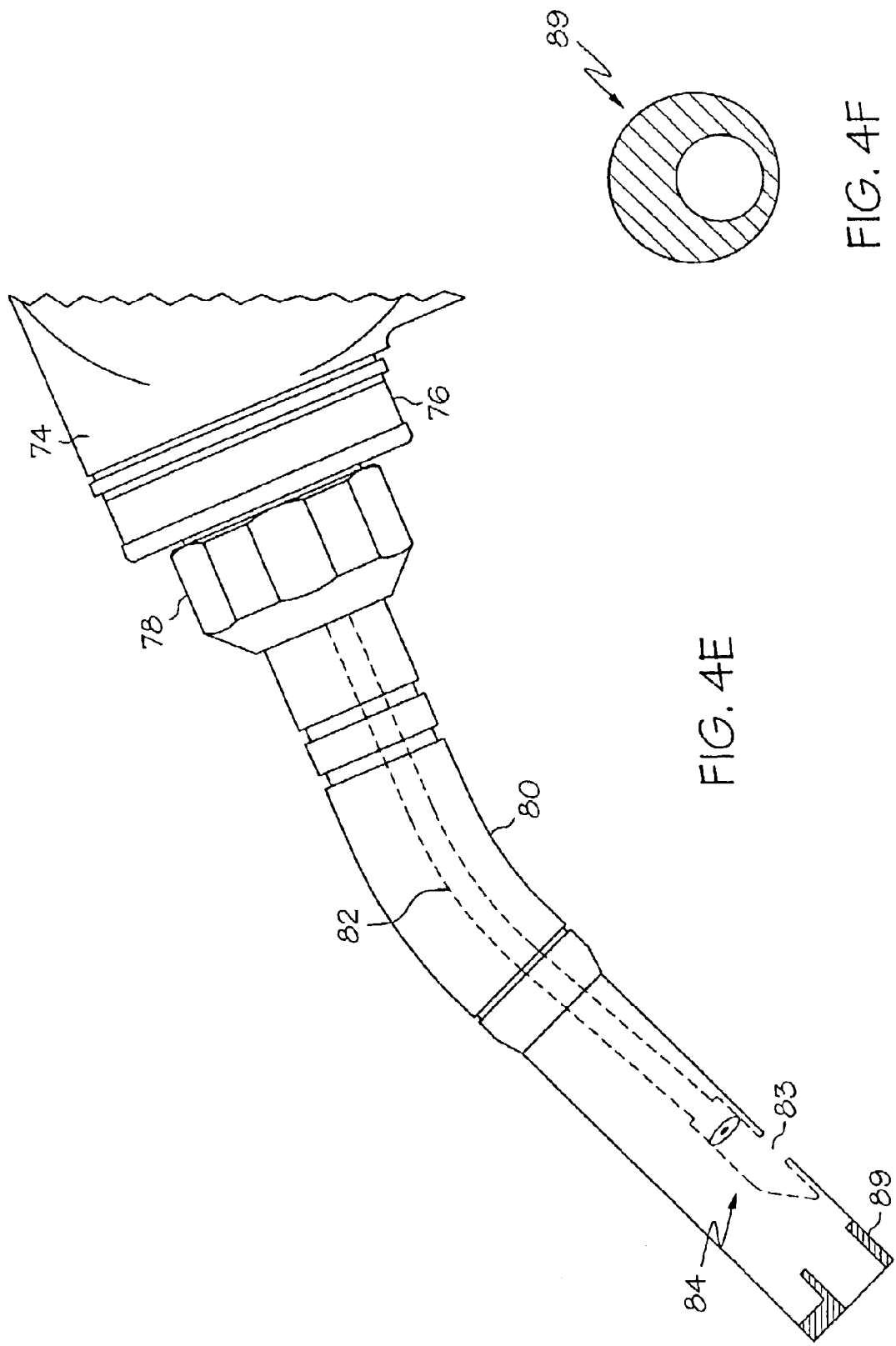

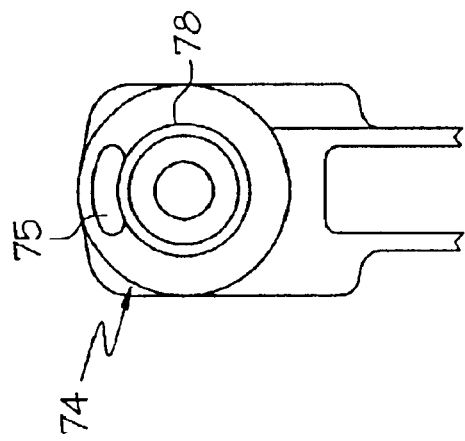
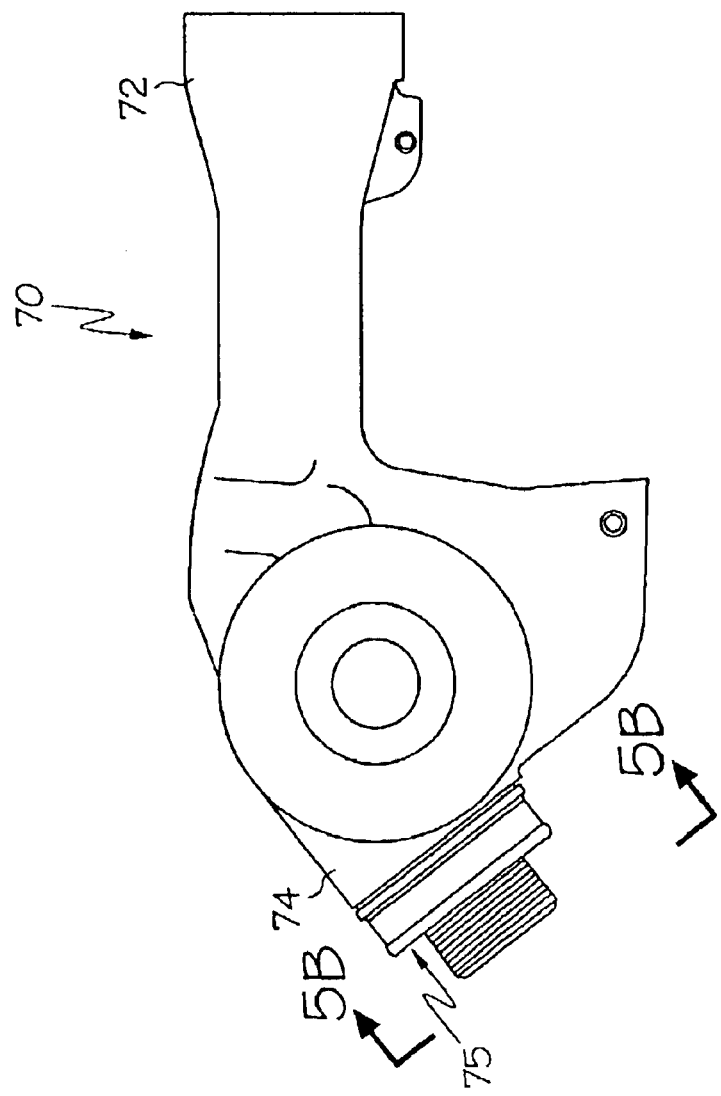

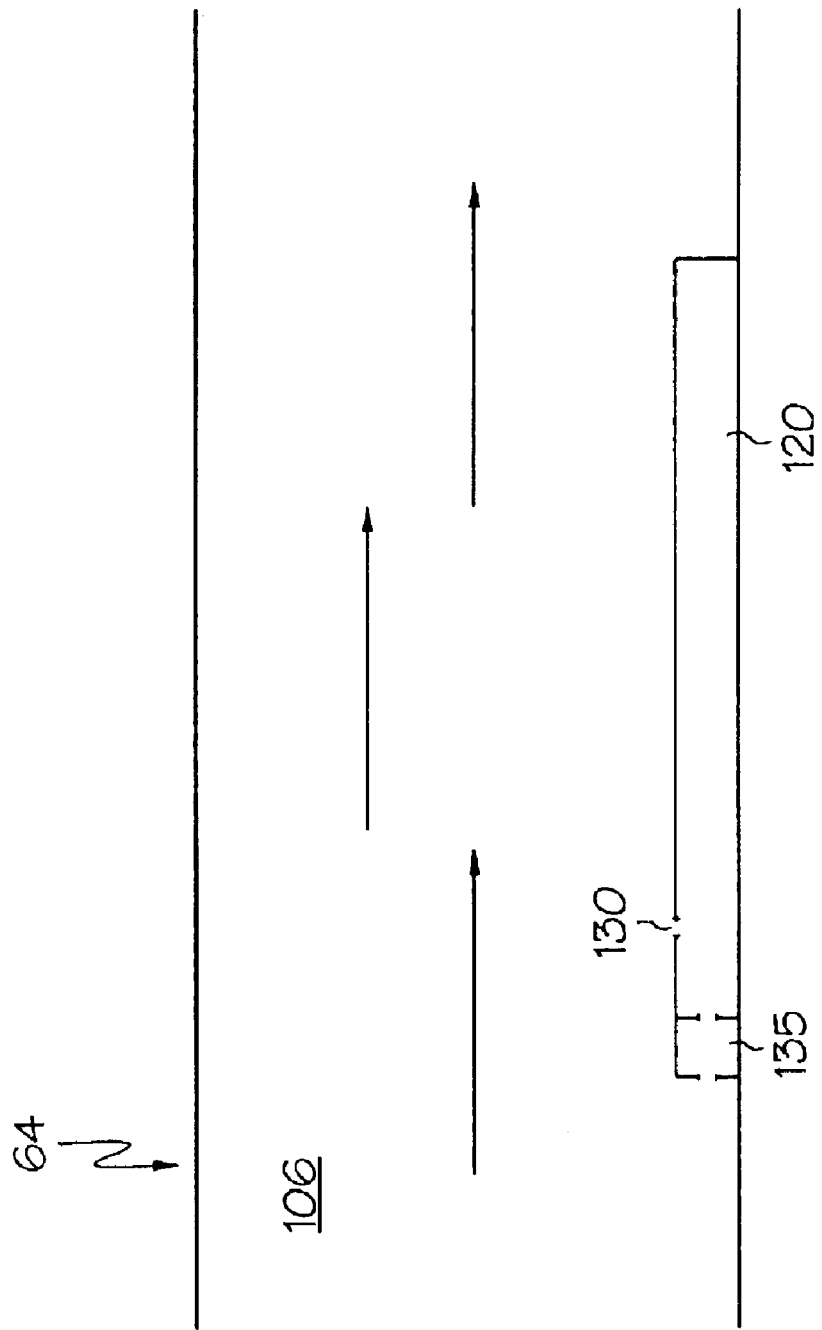

FUEL STORAGE AND DISPENSING SYSTEM

CROSS-REFERENCE TO RELATED APPLICATIONS

This application claims the benefit of U.S. Provisional Application Ser. No. 60/354,703, filed Feb. 6, 2002, and is related to U.S. patent application Ser. No. 09/963,107, filed Sep. 24, 2001 now U.S. Pat. No. 6,608,484, which is related to U.S. patent application Ser. No. 09/440,520, filed Nov. 15, 2000 now U.S. Pat. No. 6,293,996 and Ser. No. 09/036,119, filed Mar. 6, 1998 now U.S. Pat. No. 5,985,002. This application is also related to U.S. patent application Ser. No. 09/796,108, filed Feb. 28, 2001 now U.S. Pat. No. 6,360,789.

BACKGROUND OF THE INVENTION

The present invention relates generally to a fuel storage and dispensing system and, more particularly, to a system which employs a storage tank, a fuel dispenser, a fuel dispensing nozzle and spout, a boot, a pressure relief chamber, a filter system, and a pump to reduce the discharge of pollutants from underground fuel storage tanks, as well as the emission of hydrocarbon vapors above ground during fueling. The system is arranged to discharge pollutant free air through an air exhaust port when the pressure within the system reaches a predetermined level. Air to be discharged is separated from fuel vapor within the filter system prior to its discharge.

In addition to the capture of pollutants that are vented from underground fuel storage tanks, the petroleum industry has increasingly made provisions for recovering fuel vapors that are displaced from a vehicle fuel tank as fuel is discharged therein. Generally, there are two types of systems designed for vapor recovery—pressure balance recovery systems and vacuum-induced vapor recovery systems.

Pressure balance systems involve the addition of a vapor return conduit system that extends from a dispenser nozzle, through a hose, to a dispenser pedestal and then through an underground conduit system to a point of disposal. Most frequently, the means of disposal is simply to return the vapors to the storage tank from which fuel is drawn to fill the fuel tank of the vehicle. As fuel is withdrawn from the storage tank in fueling a vehicle, the vapor space within the storage tank is increased. Conversely, as fuel is introduced into the fuel tank of a vehicle, vapor space is decreased to essentially an identical extent. The resultant pressure differentials cause the vapors to flow through the vapor conduit system from the nozzle back into the storage tank, thereby creating a pressure balance.

Vacuum-induced vapor recovery systems employ vapor recovery lines as well as a vacuum assist to enhance the return of displaced vapors to the storage tanks. Vacuum assist nozzles also include a vapor return passage for connection with a coaxial hose, at the opposite or hose attachment end of the nozzle. However, the nozzles employed in vacuum assist systems are not without faults. The coaxial design of the nozzle is prone to dripping once fueling is complete and the nozzle is discharged from the vehicle tank inlet pipe. Such dripping can lead to significant emission of volatile organic compounds ("VOC") into the environment.

Accordingly, the present inventors have recognized a need for improvements in fuel, storage and dispensing system design, which is effective in reducing fugitive emissions, as well as improvements in the design of nozzles, boots, and other associated assemblies for vacuum-induced vapor recovery systems.

SUMMARY OF THE INVENTION

The present invention meets the above-mentioned needs by providing a fuel storage and dispensing system, a fuel dispensing nozzle and spout assembly, a pressure relief assembly, a vapor recovery boot, and a Venturi shut-off assembly for a fuel dispensing nozzle and spout. Although the present invention is not limited to specific advantages or functionality, it is noted that each embodiment of the instant invention is effective in reducing the emission of volatile organic compounds into the environment both during fueling, as well as during storage of gasoline.

In accordance with one embodiment of the present invention, a fuel storage and dispensing system is provided comprising at least one storage tank, an air exhaust port, at least one fuel dispenser, a fuel dispensing nozzle, a rigid, fuel dispensing spout, a boot, a pressure relief chamber, a filter system, and at least one pump. The storage tank includes at least one fluid vent port and at least one pollutant return port. At least one fuel delivery port and at least one vapor return port are configured to couple the storage tank to the fuel dispenser.

The fuel dispenser comprises a vapor assist hose, a meter, and a dispenser coupling. The vapor assist hose defines a fuel dispensing passage and a vapor recovery passage, wherein the vapor assist hose extends from a fuel input end to a fuel dispensing end. The meter is configured to provide an indication of an amount of fuel dispensed through the vapor assist hose. The dispenser coupling is configured to place the fuel dispensing passage in communication with the fuel delivery port and the vapor recovery passage in communication with the vapor return port.

The fuel dispensing nozzle defines a hose attachment end and a spout attachment end. The hose attachment end is coupled with the fuel dispensing end of the vapor assist hose. The spout attachment end further defines a vapor return opening, and the vapor recovery passage of the vapor assist hose is in communication with the vapor return opening. The vapor return opening defined by the spout attachment end of the fuel dispensing nozzle can be positioned about an outer periphery of the rigid, fuel dispensing spout.

The rigid, fuel dispensing spout is coupled to the spout attachment end of the fuel dispensing nozzle. The fuel dispensing passage of the vapor assist hose is in communication with the rigid, fuel dispensing spout. The rigid, fuel dispensing spout further defines a non-coaxial fuel tube. The non-coaxial fuel tube can be configured to be substantially dripless.

The rigid, fuel dispensing spout can further comprise mounting hardware having an outer boundary. The mounting hardware can be configured to attach the rigid, fuel dispensing spout to the spout attachment end of the fuel dispensing nozzle. The vapor return opening can be positioned outside of the outer boundary of the mounting hardware on the spout attachment end of the fuel dispensing nozzle.

The boot defines a proximal end and a distal end. The proximal end is coupled to the spout attachment end of the fuel dispensing nozzle. The distal end is configured for communication with a surface proximate a fuel tank inlet pipe of a vehicle during fueling. The boot is positioned surrounding the rigid, fuel dispensing spout and defines an annular passage configured for receiving fuel vapor displaced from the fuel tank inlet pipe of the vehicle during fueling. The annular passage is in communication with the vapor return opening in the spout attachment end of the fuel dispensing nozzle.

The pressure relief chamber is in communication with the fuel dispensing passage of the vapor assist hose. The pressure relief chamber comprises a bleed hole and a fluid volume sufficient to enable fuel traveling within the fuel dispensing passage of the vapor assist hose to create a pressure relief vacuum within the chamber. The pressure relief vacuum has a magnitude sufficient to compensate for high temperature pressure build-up in the vapor assist hose.

The filter system comprises a filter input port coupled to the fluid vent port. The at least one pump is configured to cause fluid to pass through the filter input port. The storage tank, the filter system, and the pump are configured such that the storage tank and additional portions of the fuel storage and dispensing system operate below atmospheric pressure.

The fuel storage and dispensing system can further comprise at least one pressure sensor. The pressure sensor is configured to monitor pressure at one or more diagnostic points within the fuel storage and dispensing system. The pressure sensor can be configured to provide an indication of pressure. The indication of pressure can be greater than, less than, or equal to atmospheric pressure. The pressure sensor can be configured to provide an indication of pressure within or at one or more of the storage tank, the fluid vent port, the pollutant return port, the air exhaust port, the fuel dispenser, the vapor return port, the vapor assist hose, the vapor recovery passage, the dispenser coupling, the fuel dispensing nozzle, the pressure relief chamber, the vapor return opening, the boot, the filter system, and the pump. The pressure sensor can be coupled to a dispenser display. The dispenser display is configured to provide an indication of pressure.

The fuel storage and dispensing system can further comprise a data processor that is coupled to the pressure sensor. The data processor is configured to process pressure measurements received from the pressure sensor, and to generate a pressure data profile of the fuel storage and dispensing system. The data processor can be further configured to generate a leak alarm when pressure monitored at one of the one or more diagnostic points exceeds a predetermined level. The data processor can be further configured to correlate a position of a selected diagnostic point with the pressure monitored exceeding a predetermined level. Moreover, the data processor can be further configured to generate a vapor return port blockage signal when pressure monitored at the vapor return port exceeds a predetermined level. The system can further comprise a wireless transmitter in communication with the pressure sensor. The wireless transmitter is configured to transmit a signal indicative of pressure.

The fuel storage and dispensing system of the present embodiment can further comprise a microwave unit arranged to direct microwave radiation at fluid released through the air exhaust port.

In accordance with another embodiment of the present invention, a fuel dispensing nozzle and spout assembly is provided comprising a fuel dispensing nozzle and a rigid, fuel dispensing spout. The fuel dispensing nozzle defines a hose attachment end and a spout attachment end. The hose attachment end is coupled with a fuel dispensing end of a vapor assist hose. The spout attachment end further defines a vapor return opening. The vapor return opening defined by the spout attachment end of the fuel dispensing nozzle can be positioned about an outer periphery of the rigid, fuel dispensing spout. A vapor recovery passage of the vapor assist hose is in communication with the vapor return opening. The rigid, fuel dispensing spout is coupled to the spout attachment end of the fuel dispensing nozzle. A fuel dispensing passage of the vapor assist hose is in communication with the rigid, fuel dispensing spout, which further defines a non-coaxial fuel tube. The non-coaxial fuel tube can be configured to be substantially dripless. The spout can be configured to fit within a fuel tank inlet pipe of a vehicle for fueling of the vehicle.

The rigid, fuel dispensing spout can further comprise mounting hardware having an outer boundary. The mounting hardware can be configured to attach the rigid, fuel dispensing spout to the spout attachment end of the fuel dispensing nozzle. The vapor return opening can be positioned outside of the outer boundary of the mounting hardware on the spout attachment end of the fuel dispensing nozzle.

The rigid, fuel dispensing spout can further define a mid section and the spout can be partially vertically bent down at the mid section to define a bend. The bend can be about 22° down vertically. The spout can further define a sidewall, a shutoff sensing tube positioned within the spout, and an inlet hole. The inlet hole completely traverses the sidewall of the rigid spout and the shutoff sensing tube is in communication with the inlet hole. The shutoff sensing tube can include a check valve and is coupled to a Venturi shut-off valve positioned within the fuel dispensing nozzle.

The shutoff sensing tube can further define a trap. The trap is oriented forward the inlet hole and can comprise a greater than 90° bend that defines a collection area. The shutoff sensing tube can define an inside diameter that comprises a TEFLON® or polytetrafluoroethylene coating. In addition, the spout can further define a spout gutter that is defined within an inner periphery of the rigid, fuel dispensing spout.

The fuel dispensing passage and the vapor recovery passage of the vapor assist hose can be defined as coaxial passages within the vapor assist hose. The vapor recovery passage surrounds the fuel dispensing passage.

The fuel dispensing nozzle and spout assembly can further comprise a boot defining a proximal end and a distal end. The proximal end is coupled to the spout attachment end of the fuel dispensing nozzle. The distal end is configured for communication with a surface proximate a fuel tank inlet pipe of a vehicle during fueling. The boot can comprise a pliable material, which can be synthetic or polymeric, for example, polyester-type polyurethane rubber. The pliable material can be transparent and the boot can further comprise at least one convolution positioned between the proximal and the distal ends of the boot proximate the bend in the rigid, fuel dispensing spout. The convolution is configured to allow the boot to flex when in communication with the surface proximate the fuel tank inlet pipe of the vehicle during fueling.

The boot can further comprise an annular rib positioned on the distal end of the boot. The annular rib is configured to fit against the surface proximate the fuel tank inlet pipe of the vehicle during fueling. The boot is configured to maintain a sufficient level of vacuum within the fuel storage and dispensing system to ensure adequate vapor recovery and accurate system diagnostics. The boot is positioned surrounding the rigid, fuel dispensing spout and defines an annular passage configured for receiving fuel vapor displaced from the fuel tank inlet pipe of the vehicle during fueling. The annular passage is in communication with the vapor return opening in the spout attachment end of the fuel dispensing nozzle. The boot is configured to prevent fresh air from entering the vapor return opening in the spout attachment end of the fuel dispensing nozzle.

The fuel dispensing nozzle and spout assembly can further comprising at least one pressure relief chamber in communication with the fuel dispensing passage of the vapor assist hose. The pressure relief chamber can comprise at least one bleed hole and a fluid volume sufficient to enable fuel traveling within the fuel dispensing passage of the vapor assist hose to create a pressure relief vacuum within the chamber. The pressure relief vacuum has a magnitude sufficient to compensate for high temperature pressure build-up in the vapor assist hose. The pressure relief chamber can comprise a check valve that is configured so that during fueling, fuel that has collected within the pressure relief chamber is expelled from the pressure relief chamber.

In accordance with still another embodiment of the present invention, a pressure relief assembly is provided comprising at least one pressure relief chamber in communication with a fuel dispensing passage of a coaxial, vapor assist hose. The pressure relief chamber comprises at least one bleed hole and a fluid volume sufficient to enable fuel traveling within the fuel dispensing passage of the vapor assist hose to create a pressure relief vacuum within the chamber. The pressure relief vacuum has a magnitude sufficient to compensate for high temperature pressure build-up in the vapor assist hose. The pressure relief chamber can further comprise a check valve that is configured so that during fueling, fuel that has collected within the pressure relief chamber is expelled from the pressure relief chamber.

In accordance with yet another embodiment of the present invention, a vapor recovery boot assembly is provided comprising a boot positioned surrounding a rigid, fuel dispensing spout and defining a proximal end, a distal end, and a medial portion. The proximal end is configured for coupling with a fuel dispensing nozzle comprising a vapor return opening. The distal end defines a flange configured for communication during fueling with a surface proximate a fuel tank inlet pipe of a vehicle. The medial portion is positioned between the distal and proximal ends and defines an annular passage. The annular passage is configured for receiving fuel vapor displaced from the fuel tank inlet pipe of the vehicle during fueling. The annular passage is in communication with the vapor return opening in the fuel dispensing nozzle. The rigid, fuel dispensing spout further defines a non-coaxial fuel tube. The non-coaxial fuel tube can be configured to be substantially dripless.

The boot can comprise a pliable material, which can be transparent. The pliable material can be synthetic or polymeric, such as polyester-type polyurethane rubber. The medial portion of the boot can further comprise a least one convolution that is configured to allow the boot to flex when in communication during fueling with the surface proximate the fuel tank inlet pipe. The flange can further comprise an annular rib that is configured for communication during fueling with the surface proximate the fuel tank inlet pipe. The boot is configured to prevent fresh air from entering the vapor return opening in the fuel dispensing nozzle. The proximate end can further comprise a furrow, the fuel dispensing nozzle can further comprise a knurl, and the furrow is configured for attachment to the knurl with a removable hose clamp.

In accordance with still yet another embodiment of the present invention, a Venturi shut-off assembly for a fuel dispensing nozzle and spout is provided comprising a fuel dispensing nozzle defining a hose attachment end and a spout attachment end. A rigid, fuel dispensing spout coupled to the spout attachment end of the fuel dispensing nozzle defines a non-coaxial fuel tube. The non-coaxial fuel tube can be configured to be substantially dripless. The spout further defines a sidewall, a shutoff sensing tube positioned within the spout, and an inlet hole. The inlet hole completely traverses the sidewall of the spout and the shutoff sensing tube is in communication with the inlet hole. The shutoff sensing tube further defines a check valve and the shutoff sensing tube is coupled to a Venturi shut-off valve positioned within the fuel dispensing nozzle.

Accordingly, it is a feature of the present invention to provide a fuel storage and dispensing system which is effective in reducing fugitive emissions. It is also a feature of the present invention to provide a fuel dispensing nozzle and spout assembly, and a vapor recovery boot assembly, which is effective in reducing fugitive emissions. It is also a feature of the present invention to provide a pressure relief assembly and a Venturi shut-off assembly, which both further reduce the emission of harmful volatile organic compounds into the environment. These and other features and advantages of the invention will be more fully understood from the following detailed description taken together with the accompanying drawings. It is noted that the scope of the appended claims is defined by the recitations therein and not by the specific discussion of features and advantages set forth in the present description.

BRIEF DESCRIPTION OF THE SEVERAL VIEWS OF THE DRAWINGS

The following detailed description of the embodiments of the present invention can be best understood when read in conjunction with the following drawings, where like structure is indicated with like reference numerals and in which:

FIGS. 4C and 4D are side view illustrations of a rigid, fuel dispensing spout and a shutoff sensing tube exhibiting a trap for use with a fuel storage and dispensing system according to the present invention;

FIG. 4E is a side view illustration of a rigid, fuel dispensing spout exhibiting a gutter for use with a fuel storage and dispensing system according to the present invention;

FIG. 4F is a schematic illustration of a gutter for use with a fuel storage and dispensing system according to the present invention;

FIGS. 5A and 5B show a side view and a front view, respectively, of a fuel dispensing nozzle for a fuel storage and dispensing system according to the present invention, illustrating a vapor return opening at a spout attachment end of the fuel dispensing nozzle, but without the rigid, fuel dispensing spout connected thereto;

FIG. 7 is a cross-sectional illustration of a pressure relief chamber in communication with a fuel dispensing passage of a vapor assist hose for use with a fuel storage and dispensing system according to the present invention;

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DETAILED DESCRIPTION OF THE INVENTION

Figure 1:
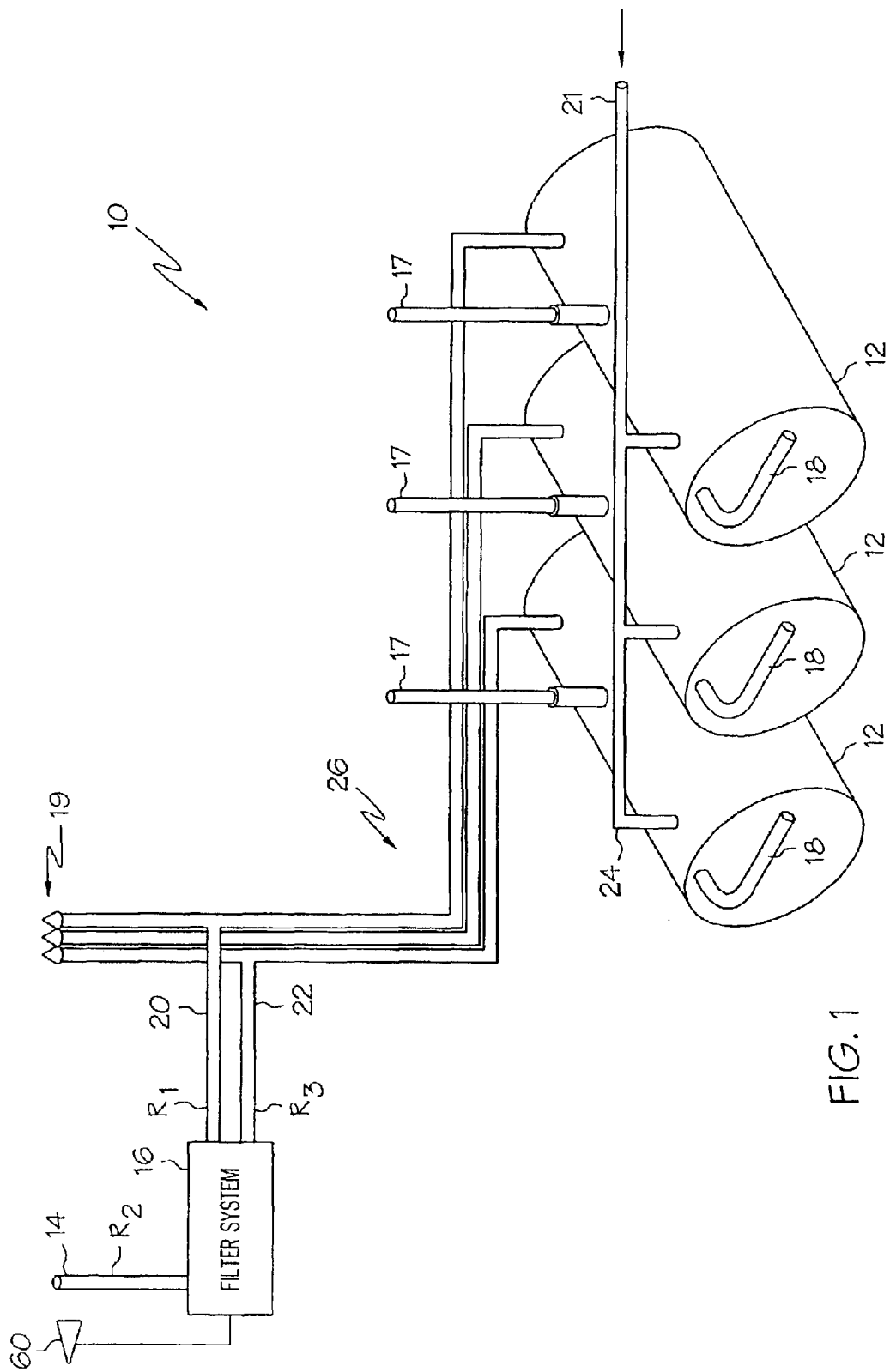
FIG. 1 is a schematic illustration of a fuel storage and dispensing system according to the present invention.

Referring initially to FIG. 1, a fuel storage and dispensing system 10 according to the present invention is illustrated. The system 10 is operated below atmospheric pressure and comprises at least one storage tank 12, an air exhaust port 14, and a filter system 16. The storage tank 12 is coupled to a fuel inlet port 17, a fuel delivery port 18, a pressure relief port 19, a fluid vent port 20, a vapor return port 21, a pollutant return port 22, vapor pressure equalization piping 24, and vent piping 26. A fuel dispensing nozzle of the fuel storage and dispensing system 10 (not shown) is arranged to return fuel vapor to the storage tank 12 via the vapor return port 21.

As will be appreciated by those practicing the present invention, the specifics of the design of the storage tank 12, fuel inlet port 17, fuel delivery port 18, pressure relief port 19, fluid vent port 20, vapor return port 21, pollutant return port 22, vapor pressure equalization piping 24, and vent piping 26, is conventionally available information and is not the subject of the present invention. For example, reference is made to U.S. Pat. No. 5,464,466, issued to Nanaji et al. on Nov. 7, 1995; U.S. Pat. No. 5,484,000, issued to Hasselmann on Jan. 16, 1996; U.S. Pat. No. 4,566,504, issued to Furrow et al. on Jan. 28, 1986; U.S. Pat. No. 4,687,033, issued to Furrow et al. on Aug. 18, 1987; U.S. Pat. No. 5,035,271, issued to Carmack et al. on Jul. 30, 1991; U.S. Pat. No. 5,051,114, issued to Nemser et al. on Sep. 24, 1991; U.S. Pat. No. 5,141,037, issued to Carmack et al. on Aug. 25, 1992; U.S. Pat. No. 5,590,697, issued to Benjey et al. on Jan. 7, 1997; U.S. Pat. No. 5,592,963, issued to Bucci et al. on Jan. 14, 1997; U.S. Pat. No. 5,592,979, issued to Payne et al. on Jan. 14, 1997; U.S. Pat. No. 5,620,030, issued to Dalhart et al. on Apr. 15, 1997; U.S. Pat. No. 5,620,031, issued to Dalhart et al. on Apr. 15, 1997; and U.S. Pat. No. 5,678,614, issued to Grantham on Oct. 21, 1997, the disclosures of which are incorporated herein by reference. It is noted that, for the purposes of describing and defining the present invention, any reference herein to a fluid denotes a gas, a liquid, a gas/liquid mixture, or a gas, liquid, or gas liquid mixture carrying particulate matter, such as a petroleum derived fuel for powering vehicles (i.e., gasoline or diesel fuel).

Figure 2:
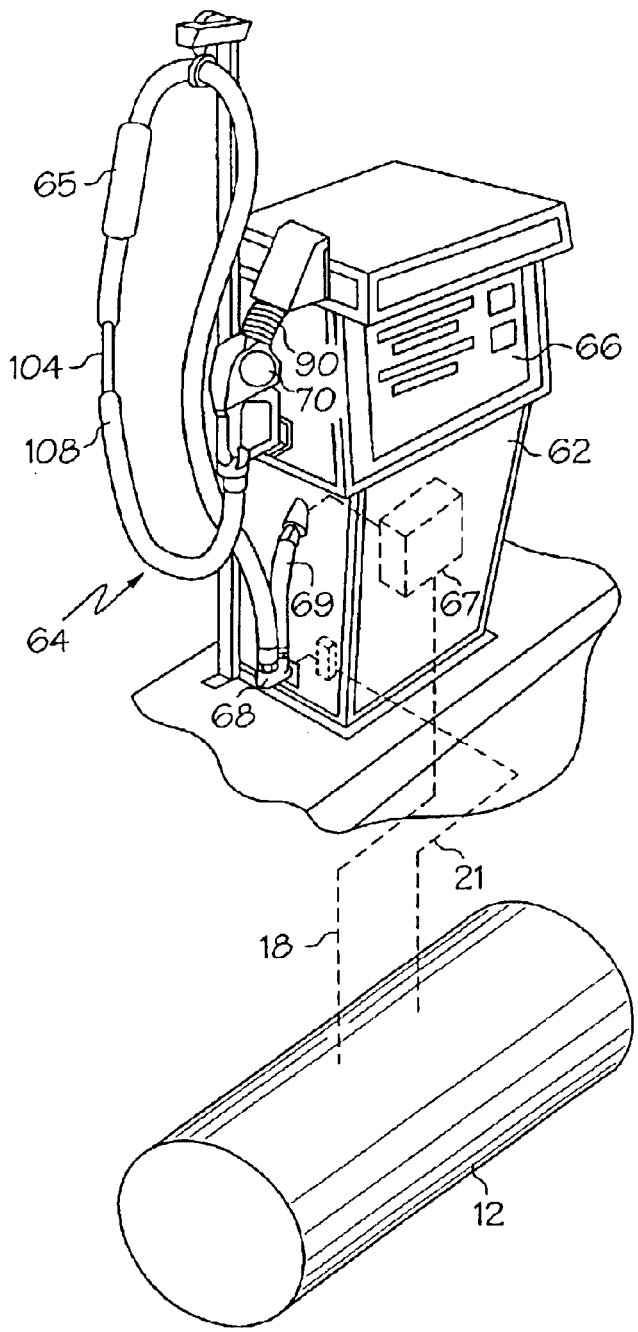
FIG. 2 is an illustration of a fuel dispenser according to the present invention.
Figure 3:
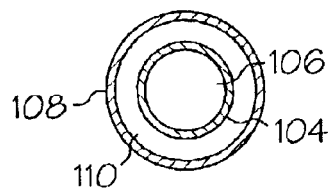
FIG. 3 is a cross-sectional illustration of a vapor assist hose according to the present invention.

The present invention further comprises at least one fuel dispenser. FIG. 2 illustrates a pedestal-type fuel dispenser 62 mounted on an elevated island at a filling station. Fuel to be dispensed from the dispenser 62 is derived from an underground storage tank 12, being conveyed thereto by a fuel delivery port 18 that is configured to couple the storage tank 12 to the fuel dispenser 62. Typically, as fuel is dispensed, it drives a meter 67 mounted within the fuel dispenser 62 and its output is shown on a register 66 that indicates the amount and cost of fuel delivered. Fuel flows from the meter 67 through a jumper hose 69 to a dispenser coupling 68. The dispenser coupling 68 has provision for connection to a vapor assist hose 64 having both fuel and vapor passages. The vapor assist hose 64 defines a fuel input end and a fuel dispensing end. Specifically, the coaxial, vapor assist hose 64 comprises an inner tube 104 defining a fuel dispensing passage 106 and an outer tube 108 defining a vapor recovery passage 110, which surrounds the fuel dispensing passage 106 (see FIGS. 3, 4A and 4B).

Figure 4A:
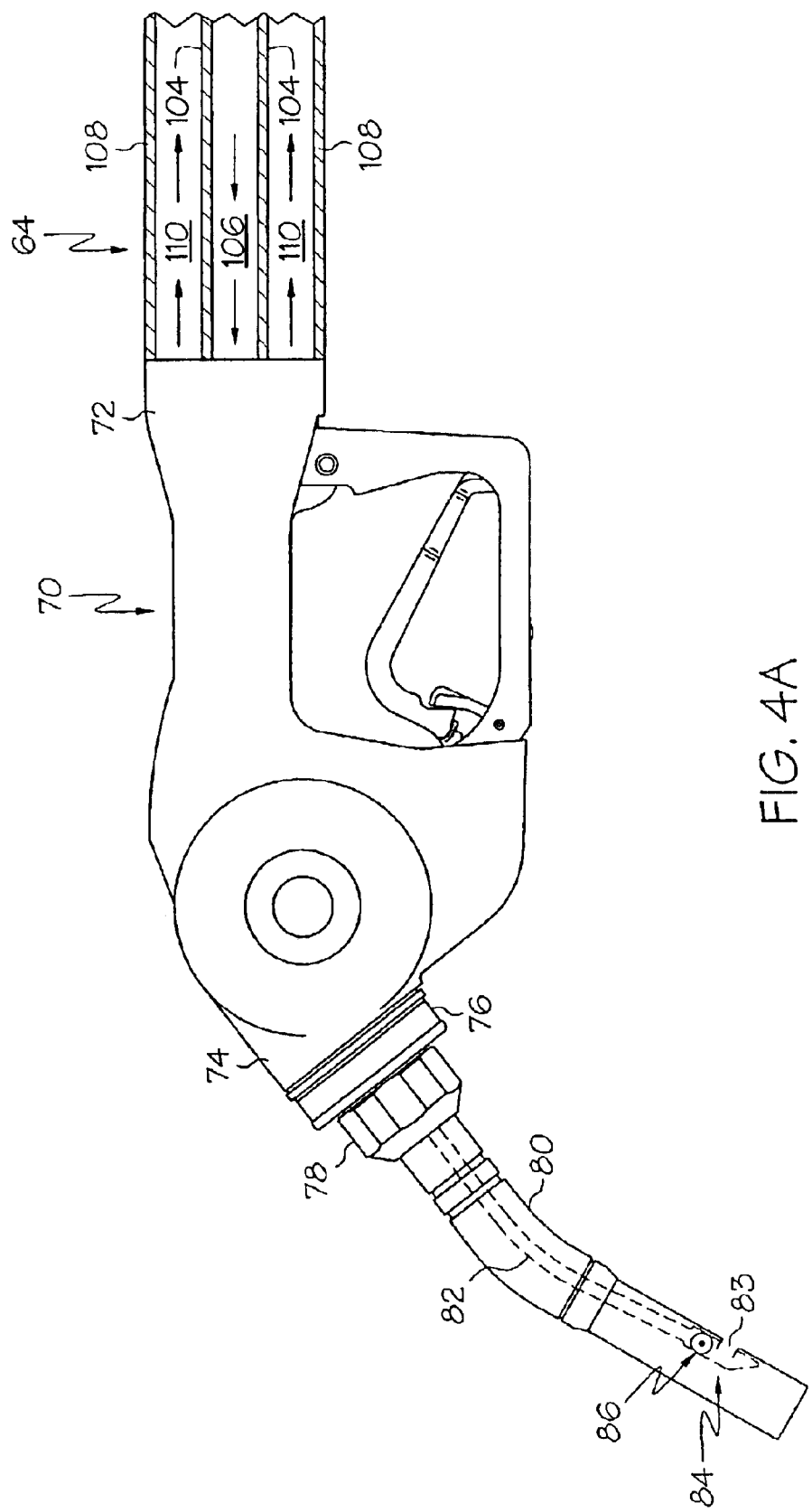
FIG. 4A is a side view illustration of a fuel dispensing nozzle and a rigid, fuel dispensing spout connected thereto for a fuel storage and dispensing system according to the present invention.
Figure 4B:
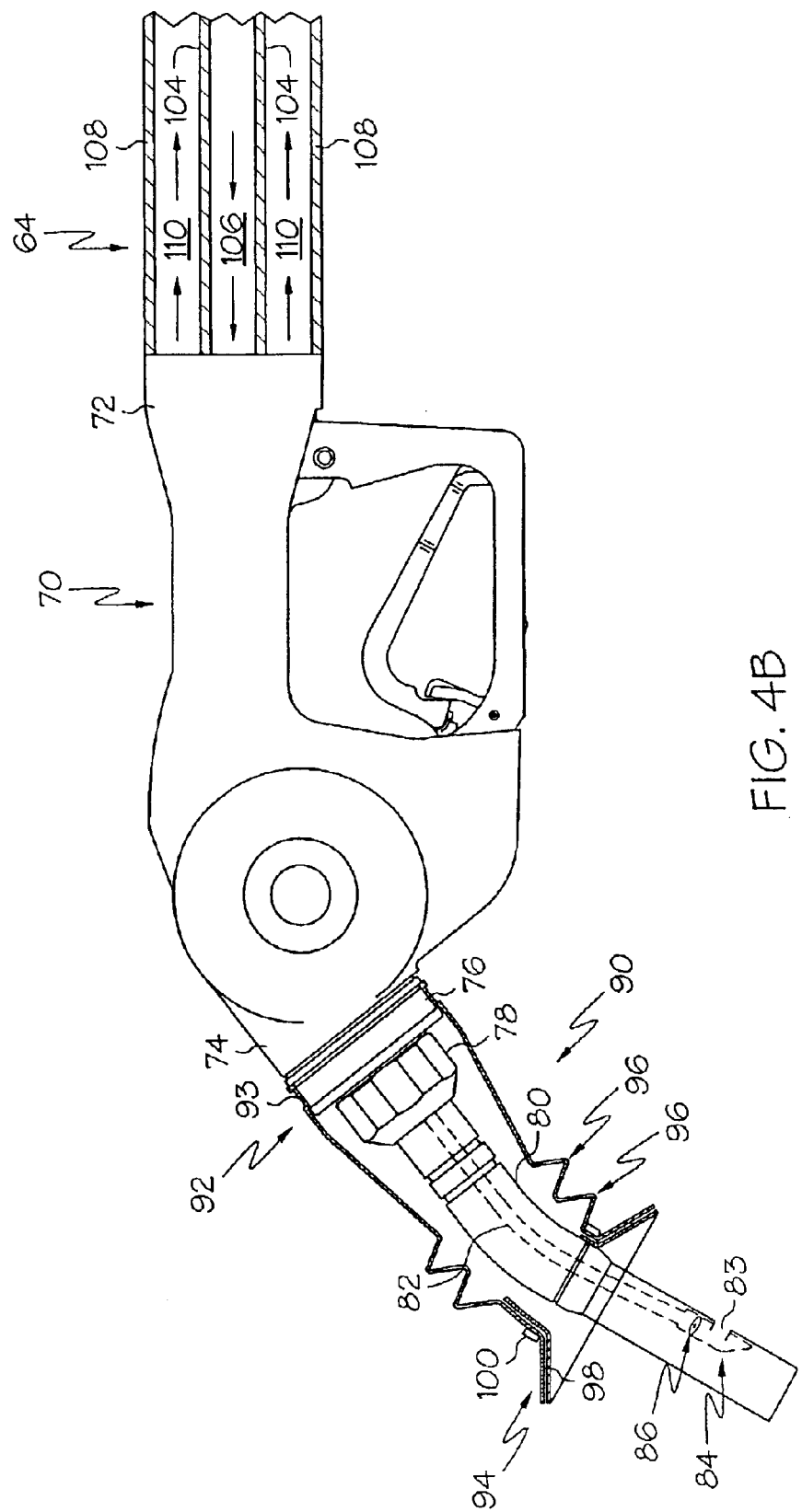
FIG. 4B is a side view illustration of a fuel dispensing nozzle, a rigid, fuel dispensing spout connected thereto, and a cross-sectional view of a boot or bellows for use with a fuel storage and dispensing system according to the present invention.

The dispenser coupling 68 is connected to the vapor assist hose 64 at the fuel input end of the vapor assist hose 64. The opposite or fuel dispensing end of the vapor assist hose 64 includes a fuel dispensing nozzle 70. As further illustrated in FIGS. 4A, 4B and 5A, the nozzle 70 defines a hose attachment end 72 and a spout attachment end 74. The hose attachment end 72 of the fuel dispensing nozzle 70 is coupled with the fuel dispensing end of the vapor assist hose 64. A rigid, fuel dispensing spout 80 is coupled with the spout attachment end 74 of the nozzle 70 for communication with a fuel tank inlet pipe of a vehicle (not shown). In delivering fuel, the rigid spout 80 is inserted into the inlet pipe. The spout 80 can be partially vertically bent down at its approximate mid section to define a bend. The bend can be about 22° down vertically. A vapor return opening 75 is included in the spout attachment end 74 of the nozzle 70 (see FIG. 5B). The vapor return opening 75 defined by the spout attachment end 74 of the fuel dispensing nozzle 70 is positioned about an outer periphery of the rigid, fuel dispensing spout 80. As illustrated in FIGS. 4A, 4B and 5B, the fuel dispensing spout 80 further comprises mounting hardware 78. The mounting hardware 78 has an outer boundary and is configured to attach the rigid, fuel dispensing spout 80 to the spout attachment end 74 of the fuel dispensing nozzle 70. The vapor return opening 75 is positioned outside of the outer boundary of the mounting hardware 78 on the spout attachment end 74 of the fuel dispensing nozzle 70.

Unlike the rigid spouts of conventional nozzles for vacuum-induced vapor recovery systems, the rigid spout 80 of the present invention instead defines a non-coaxial fuel tube for fuel from the fuel dispensing passage 106 of the vapor assist hose 64 to pass through. Conventional coaxial spouts are more prone to drip fuel after being withdrawn from the inlet pipe of a vehicle because of the relatively large amount of hardware surface area in contact with or near the fuel dispensed by the spout. In contrast, the non-coaxial design of the rigid spout 80 eliminates much of the flow passage hardware required in the conventional coaxial design and can be substantially dripless. By "substantially dripless" we mean that upon withdrawing the rigid, fuel dispensing spout 80 from the inlet pipe of a vehicle following fueling, no more than about 0–2 drops of fuel will fall from the spout 80 under ordinary operating conditions. Therefore, the rigid spout 80 of the present invention significantly reduces the release of volatile organic compounds into the environment, as 5 drops of fuel can equal ¼ ml.

In accordance with the present invention, a non-wetting surface coating such as TEFLON® or polytetrafluoroethylene (available from E.I. du Pont de Nemours & Company, Wilmington, Del.) can be applied to the inside diameter of the rigid spout 80. While not wishing to be bound to any particular theory, it is believed that the coating decreases the surface retention of the fuel, which already has a relatively low coefficient of friction. Consequently, fuel is prevented from sticking to the surface of the inside diameter of the rigid spout 80. This enables fuel to drain from the spout 80 much faster, further limiting the occurrence of fuel dripping from the spout 80 once it is removed from the inlet pipe of a vehicle and transferred back to the fuel dispenser 62.

As illustrated in FIGS. 4A and 4B, the rigid spout 80 of the present invention can further define a shutoff sensing tube 82 and an inlet hole 83. The inlet hole 83 completely traverses the sidewall of the rigid spout 80. The shutoff sensing tube 82 is positioned within the rigid spout 80 and includes a hollow inner periphery and terminal ends 84. The one terminal end 84 is joined to the inlet hole 83 so that the tube 82 is in communication with the inlet hole 83.

In accordance with the present invention, a check valve 86, illustrated schematically in FIGS. 4A and 4B, is positioned within the shutoff sensing tube 82 as near as possible to the inlet hole 83. The check valve 86 comprises a ball and seat and is designed so that air flow does not close the valve 86, allowing the nozzle to operate as normal. However, upon filling the tank of a vehicle through the rigid spout 80, a small amount of fuel can travel up the outer periphery of the spout 80 and begin to enter the inlet hole 83. This forces the ball against the seat, preventing fuel from entering the inner periphery of the shutoff sensing tube 82. The shutoff sensing tube 82 is connected at its opposite terminal end 84 within the nozzle 70 to a Venturi shut-off valve. In this embodiment, the nozzle 70 need not necessarily comprise components for vapor recovery. Through a change of pressure within the shutoff sensing tube 82, fuel present at the inlet hole 83 of the tube 82 activates the Venturi shut-off within the nozzle 70, which shuts off fuel flow from the fuel dispenser 62. In this manner, the fuel tank of the vehicle does not overflow, releasing fuel and volatile organic compounds into the environment. Because the check valve 86 does not allow fuel to enter the shutoff sensing tube 82, fuel will not escape or drip from the inlet hole 83 once fueling is complete and the spout 80 is removed from the fuel tank inlet pipe. Moreover, the check valve 86 enables quicker shut off of fuel flow once fuel is detected at the inlet hole 83. Consequently, 10 shutoff cycles cannot expel more than 1/10 gal. of fuel.

Figure 4C:
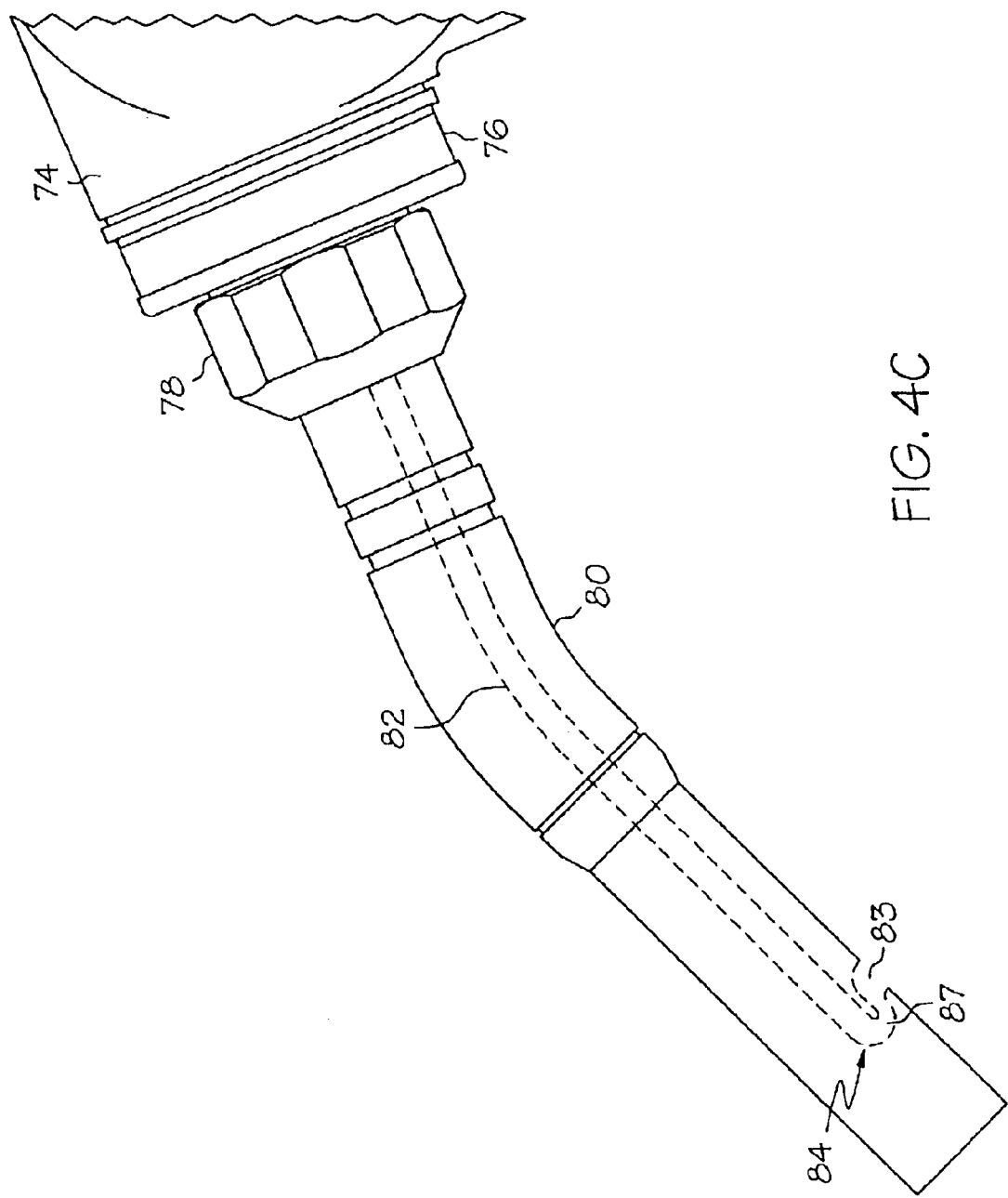

In accordance with another embodiment of the present invention, the shutoff sensing tube 82 can include a trap 87 that collects fuel which could enter the tube 82 if the check valve 86 is not present or in case of a check valve failure. As illustrated in FIGS. 4C and 4D, the trap 87 is oriented forward the inlet hole 83 and can comprise a greater than 90° bend that retains fuel in a collection area, which is defined by the trap 87. The collection area can define a volume which prevents fuel from dripping from the inlet hole 83. The collection area is not limited to any particular shape but can, for example, define a "V" or "U" shape. In accordance with the present invention, the inside diameter of the shutoff sensing tube 82 can also comprise a non-wetting TEFLON® or polytetrafluoroethylene surface coating, as described above. The coating further reduces the opportunity for fuel to dip from the inlet hole 83 once the nozzle 80 has been removed from the fuel tank inlet pipe, as any collected fuel would already have drained for from the tube 82 into the vehicle tank.

In accordance with still another embodiment of the present invention, the rigid spout 80 can further define a spout gutter 89, which is defined within the inner periphery of the spout 80 at the end opposite where the spout 80 is coupled with the spout attachment end 74 of the nozzle 70. To eliminate dripping of fuel from the spout once fueling is complete and the spout 80 is disengaged from the fuel tank inlet pipe, the spout gutter 89 effectively catches any fuel that drains from in the inner periphery of the spout 80 when held in a vertical orientation. As illustrated in FIGS. 4E and 4F, the spout gutter 89 can define an offset centerline. This configuration allows the fuel that has previously collected in the gutter 89 to drain after fueling when the spout 80 is held within the fuel tank inlet pipe at about 25°. Other configurations are contemplated which allow the gutter 89 to completely drain when held at about 25° after fueling.

Figure 6A:
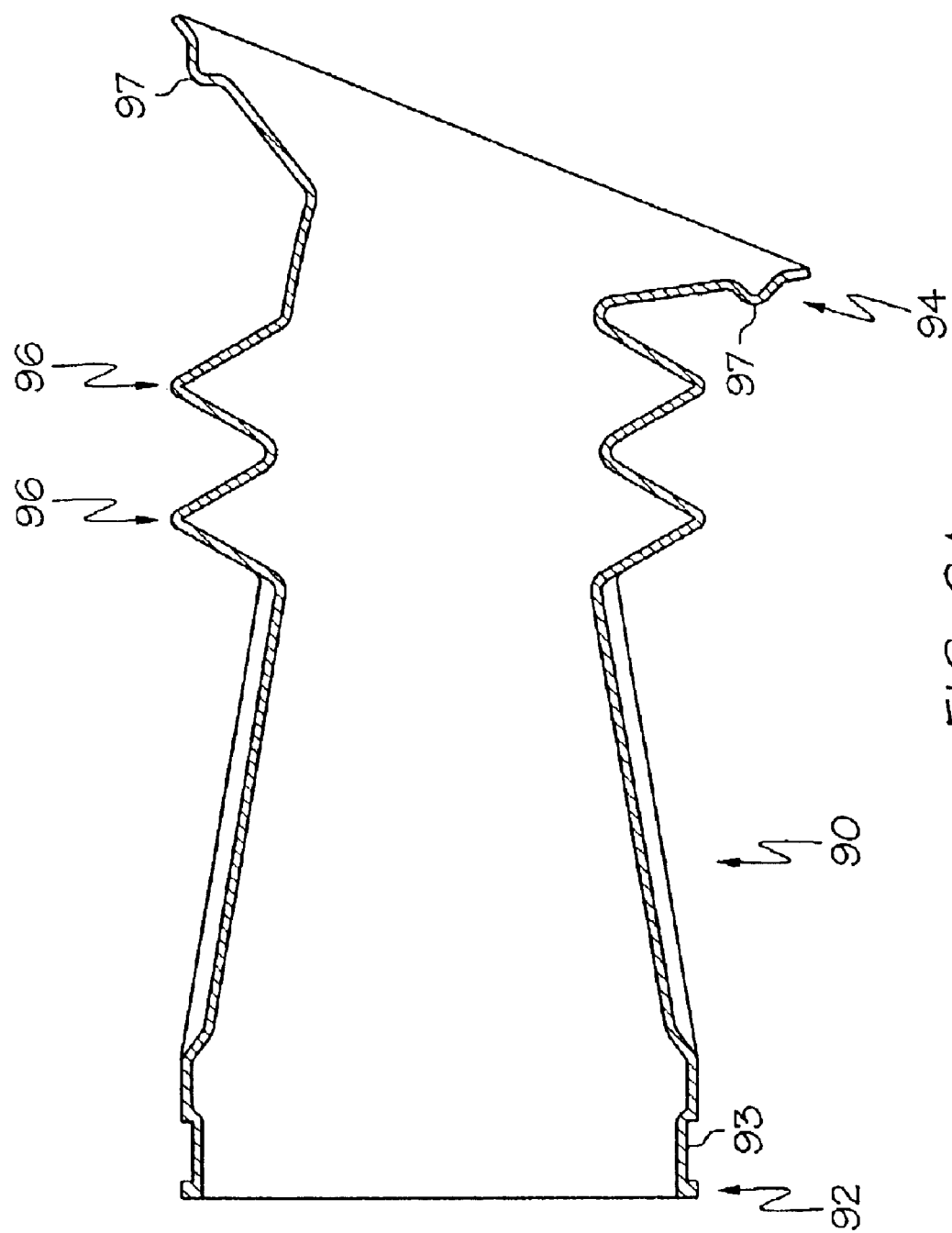
FIGS. 6A and 6B are detailed illustrations of a boot or bellows for use with a fuel storage and dispensing system according to the present invention.
Figure 6B:
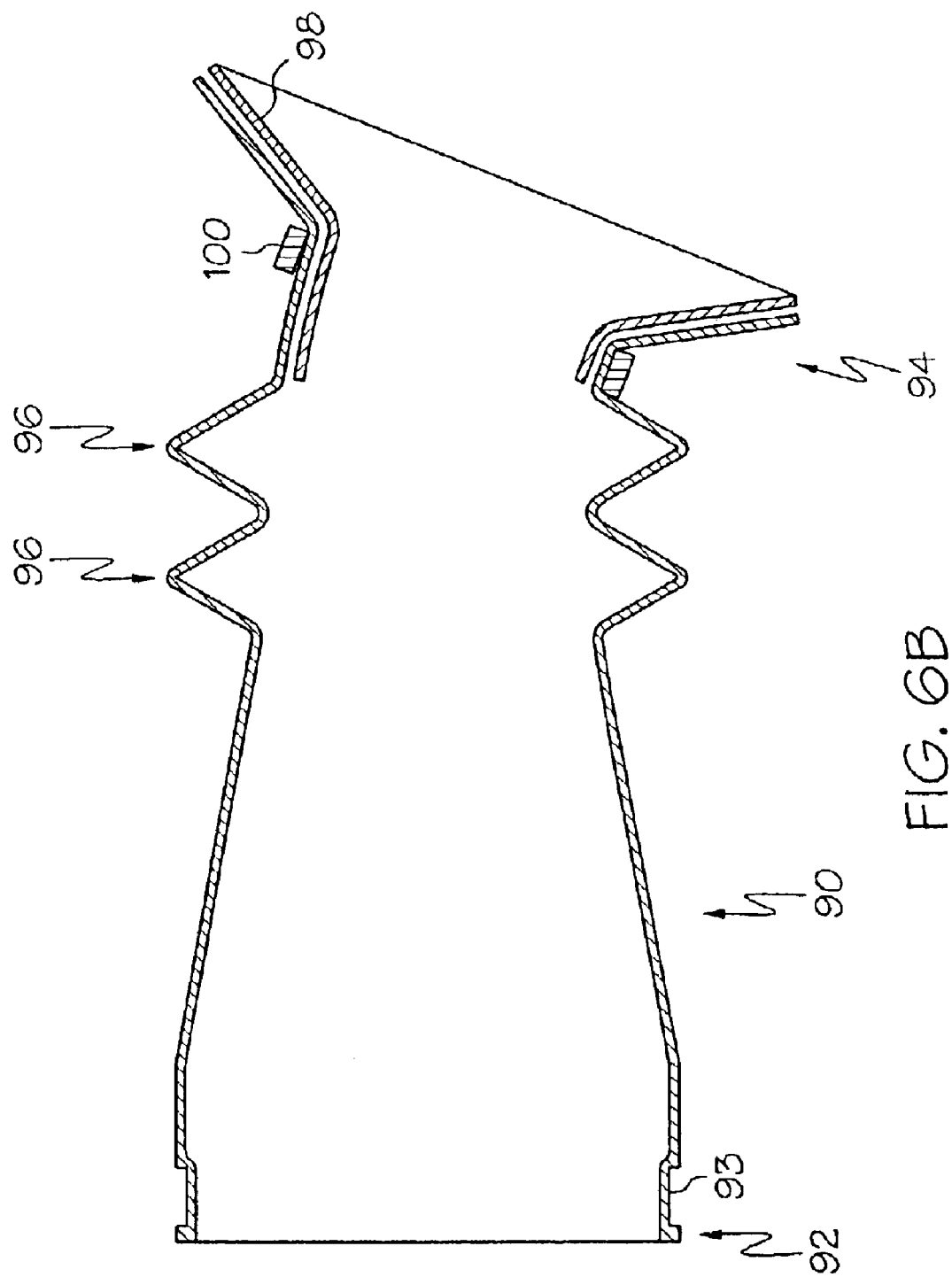

As further illustrated in FIGS. 4B, 6A and 6B, the nozzle 70 is also provided with a boot 90 which surrounds the rigid spout 80 and is secured to the nozzle 70 at the spout attachment end 74. The boot 90 defines a proximal end 92 and a distal end 94. An optional knurl 76 can be provided at the spout attachment end 74 of the nozzle 70. Although the knurl 76 is not required, the boot 90 can be secured to the knurl 76 at its proximal end 92 with a conventional hose clamp. The hose clamp fits within a furrow 93 in the boot 90. The boot 90 further includes at least one convolution 96 positioned between the proximal end 92 and the distal end 94. The convolutions 96 enable the boot 90 to flex at the bend in the mid section of the rigid spout 80. The boot 90 can be comprised of a pliable material, which can be synthetic or polymeric, such as a polyester-type polyurethane rubber, which enables the boot 90 to flex. The pliable material can be transparent.

The boot 90 is configured for communication at its distal end 94 with a surface proximate the fuel tank inlet pipe of a vehicle during delivery of fuel from the nozzle 70 and spout 80. In the embodiment illustrated in FIG. 6A, an annular rib 97 is fashioned at the distal end 94 of the boot 90 and is configured to be compressed against the inlet pipe. The present system is operated under vacuum. Consequently, it is not necessary to form a perfect vapor seal at the interface of the rib 97 and the inlet pipe. The boot 90 is configured to maintain a sufficient level of vacuum within the fuel storage and dispensing system 10. This ensures adequate recovery of fugitive emissions and accurate system diagnostics.

The boot 90 is utilized in providing an annular passage between the inlet pipe of a vehicle fuel tank and the nozzle 70 during fueling. The annular passage provides a vapor connection between the fuel tank and a vapor recovery flow path, through which fugitive emissions flow to the vapor return opening 75 in the spout attachment end 74 of the nozzle 70. From here, the vapor recovery flow path extends through the nozzle 70, through the vapor recovery passage 110 of the coaxial, vapor assist hose 64, through the dispenser coupling 68, and then through a vapor return port 21 to the storage tank 12. By covering both the vapor return opening 75 and the inlet pipe, the boot 90 is effective in preventing fresh air from entering the system 10. Given that the system is under vacuum, without the boot 90, fresh air could enter the system 10 and detrimentally affect the membranes employed in the filter system 16 of the present invention. Consequently, the boot 90 can effectively extend the useful life of the filter system membranes.

In an alternative embodiment, which is illustrated in FIG. 6B, the boot 90 defines an inner face seal 98 that is positioned about the inside diameter of the boot 90 at the distal end 94. The seal 98 can extend back to about the convolution 96 and can comprise a rigid polymeric material, such as a hard plastic. The inner face seal 98 can be secured within the boot 90 by a clamp 100, which can typically comprise a metal hose clamp.

In accordance with the present invention, at least one pressure relief chamber 120 and at least one bleed hole 130 as illustrated in FIG. 7 are provided in communication with the fuel dispensing passage 106 of the vapor assist hose 64. The pressure relief chamber 120 is employed to compensate for high temperature pressure that can build in the vapor assist hose 64 when the fuel dispenser 62 is not in use and the hose 64 is heated by the sun and hot outside air. Without such pressure relief chamber 120, high pressure within the vapor assist hose 64 can expel fuel and hydrocarbon emissions into the environment when the fuel dispenser 62 is not operating. Specifically, the pressure relief chamber 120 is effective in preventing the nozzle 70 from "spitting" or expelling fuel when the user manipulates the handle in preparation for engagement with the tank inlet pipe.

During fueling, fuel passing through the fuel dispensing passage 106 creates a vacuum in the pressure relief chamber 120 as fuel passes across the bleed hole 130. The fluid volume of the pressure relief chamber 120 is sufficient to enable fuel traveling within the fuel dispensing passage 106 to create a pressure relief vacuum within the chamber 120. The pressure relief vacuum has a magnitude sufficient to compensate for high temperature pressure build-up in the vapor assist hose 64 when the fuel dispenser 62 is not in use. The pressure relief vacuum within the pressure relief chamber 120 is effective in equalizing pressure within the fuel dispensing passage 106 by pulling fuel through the bleed hole 130, therefore decreasing the likelihood of emissions being undesirably propelled out of the nozzle 70 in between fueling sessions. The fuel which collects in the pressure relief chamber 120 is drawn rapidly out of the chamber 120 through a check valve 135, which opens once fueling begins again.

The pressure relief chamber 120 can be incorporated into a coupling that is in communication with the vapor assist hose 64, or it can be incorporated into the vapor assist hose 64 anywhere along its length. The coupling can be a breakaway coupling 65 that can be provided intermediate the length of the vapor assist hose 64 to minimize damage in the event a vehicle is driven away with the rigid spout 80 engaged in the vehicle fuel tank inlet pipe (see FIG. 2). Typically, the coupling 65 is arranged to define respective portions of the fuel dispensing passage 106 and the vapor recovery passage 110. The pressure relief chamber 120 can have an inside diameter of about 3/32" (0.09 mm) and can be up to about 3' long.

Figure 8:
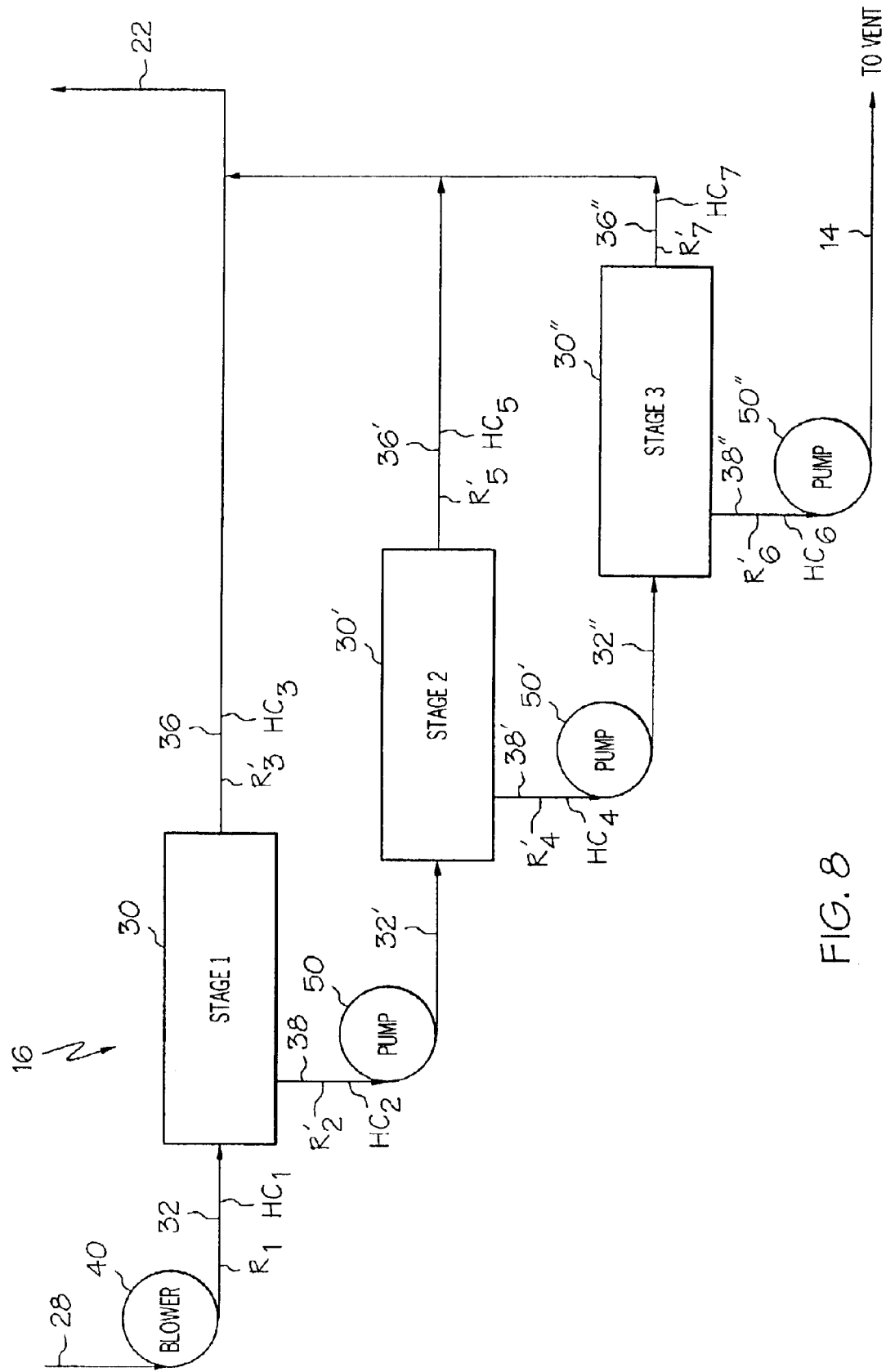
FIG. 8 is a schematic illustration of a filter system portion of a fuel storage and dispensing system according to the present invention.
Figure 9:
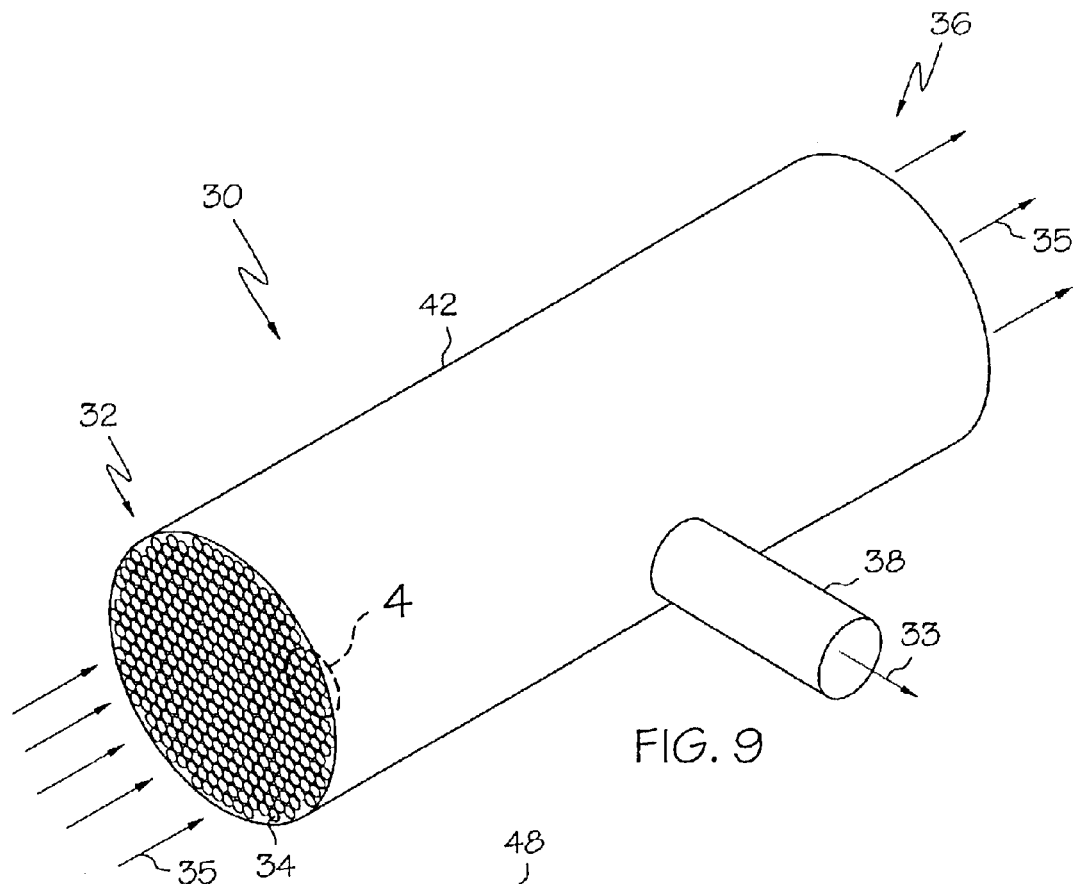
FIG. 9 is an illustration of a filter assembly portion of a fuel storage and dispensing system according to the present invention.
Figure 10:
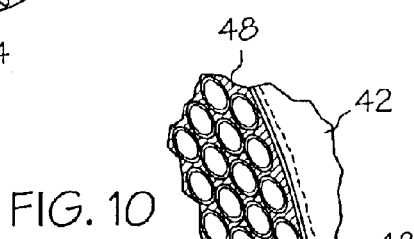
FIG. 10 is a blown up view, partially broken away, of a portion of the filter assembly illustrated in FIG. 9.
Figure 11:
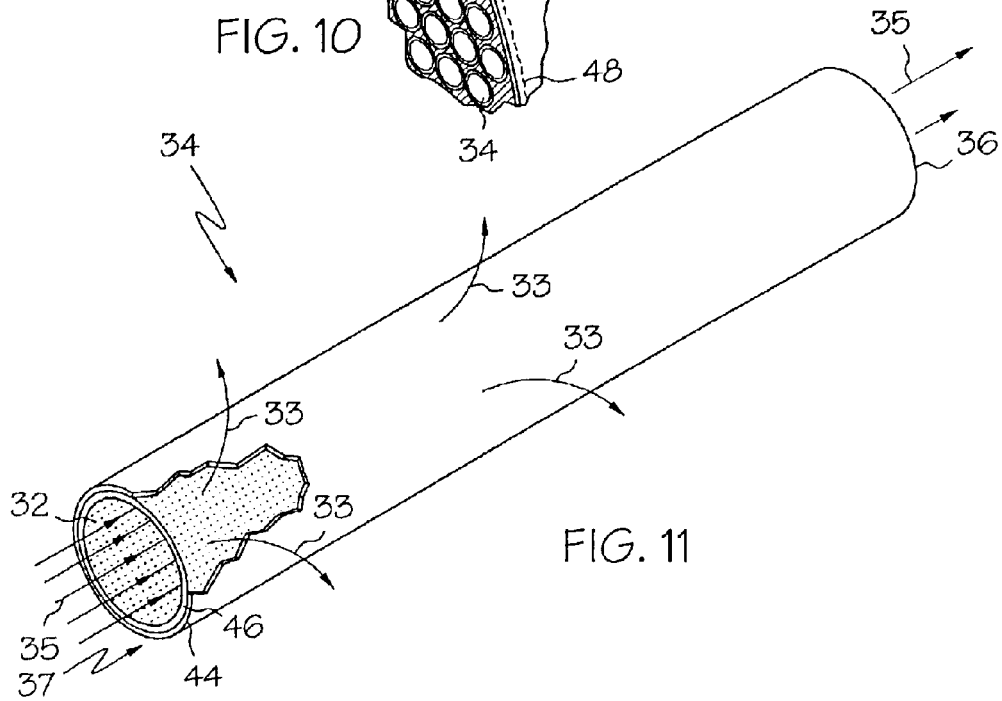
FIG. 11 is an illustration, partially broken away, of a fuel vapor duct portion of a fuel storage and dispensing system according to the present invention.

Referring now to FIGS. 8–11, the filter system 16 comprises a filter assembly 30, a primary pump or blower 40 coupled to a primary input port 28, and a secondary pump 50. The filter assembly 30 includes a filter input port 32, a plurality of fuel vapor ducts 34 (see FIGS. 9 and 10), a primary filter output port 36, and a secondary filter output port 38. The filter input port 32 is directly coupled to the fluid vent port 20 illustrated in FIG. 1 and the primary filter output port 36 is directly coupled to the pollutant return port 22, also illustrated in FIG. 1. The filter assembly 30 illustrated in FIGS. 9–11 is a product available from Compact Membrane Systems Inc., Wilmington, Del., USA, and, as is illustrated with particularity in FIG. 11, includes the porous tube 46 and a conventional, commercially available air permeable membrane 44. A conventional, commercially available air permeable membrane suitable for use with the present invention is shown in U.S. Pat. No. 5,051,114. As is described in detail below, suitable membranes for use in the present invention will pass the air component of an air/fuel vapor and inhibit passage of the pollutant component (e.g., VOC) of the air/fuel vapor. As will be appreciated by those practicing the present invention, alternatives to the filter assembly design illustrated in FIGS. 9–11 will be suitable for use within the scope of the present invention.

The fuel vapor ducts 34 define a substantially unobstructed flow path 35 extending from the filter input port 32 to the primary filter output port 36. At least a portion of, and preferably all of, each fuel vapor duct 34 forms an air-permeable partition 37 designed to pass an air component of fluid within the fuel vapor duct 34 through the air permeable partition 37, see directional arrows 33 in FIG. 9. Passage of a pollutant component of fluid, e.g., VOC, within the fuel vapor duct 34 through the air-permeable partition 37 is inhibited. Specifically, the air-permeable partition 37 comprises an air-permeable membrane 44 supported by a porous tube 46 and the substantially unobstructed flow path 35 extends along a longitudinal axis of the porous tube 46.

It is noted that, although the air permeable partition 37 of the present invention is referred to herein as air-permeable, the membrane may actually favor the passage of oxygen over nitrogen, creating a nitrogen enriched VOC stream in which fuel vapor condenses. It is also noted that the air permeable partition 37 of the present invention may also be designed to pass a water vapor component of fluid within the fuel vapor duct 34 through the air permeable partition 37. The passage of the water vapor component reduces water vapor contamination of the fuel supply overall. This aspect of the present invention is particularly advantages when using fuel components having an affinity for water vapor.

Referring to FIG. 10, it is noted that a potting compound 48 is preferably interposed between opposite end portions of adjacent fuel vapor ducts 34 to ensure that all of the fluid incident upon the filter input port 32 is forced to pass through the interior of the fuel vapor ducts 34, as opposed to through the spaces between the fuel vapor ducts 34. For the purposes of describing and defining the present invention, it is noted that when reference is made herein to the substantially unobstructed flow path 35, the presence of the potting compound 48 is not considered to be a substantial obstruction.

Referring to FIGS. 1, 8, 9 and 11, the secondary filter output port 38 is partitioned from the fuel vapor duct 34 by the air-permeable partition 37 and is directly coupled to the air exhaust port 14. The primary pump 40 is configured to cause fluid such as fuel vapor to pass from the filter input port 32 through each fuel vapor duct 34 to the primary filter output port 36. The secondary pump 50 is positioned to cause the air component within the fuel vapor duct 34 to pass through the air-permeable partition 37 to the secondary filter output port 38 and the air exhaust port 14.

As is clearly illustrated in FIG. 9, the filter system 16 includes a plurality fuel vapor ducts 34 that define respective substantially linear unobstructed flow paths 35 therein extending from the filter input port 32 to the primary filter output port 36. Each of the fuel vapor ducts 34 form separate portions of a collective air-permeable partition 37 and are enclosed within a common fuel vapor duct enclosure 42. The filter input port 32, the primary filter output port 36, and the secondary filter output port 38 are formed in the common fuel vapor duct enclosure 42. The arrangement of the fuel vapor ducts 34 and the primary pump 40 is such that fluid passes from the filter input port 32 through the fuel vapor ducts 34 to the primary filter output port 36 with a negligible pressure drop. This negligible pressure drop is largely attributable to the unobstructed nature of the flow paths 35.

Reference will now be made to FIGS. 1 and 8 in discussing the characteristics of the primary pump or blower 40 and the secondary pump 50, and the various flow rates generated within the system 16. The primary pump 40 has a characteristic pumping capacity capable of generating a first volumetric fluid flow rate $R_1$. Specifically, in some embodiments of the present invention, the primary pump 40 has a characteristic pumping capacity capable of generating a fluid flow of between approximately 150 standard cubic feet per hour and approximately 1500 standard cubic feet per hour. In one embodiment of the present invention, the primary pump 40 has a characteristic pumping capacity capable of generating a fluid flow of approximately 320 standard cubic feet per hour. The secondary pump 50 has a characteristic pumping capacity capable of generating, in combination with any downstream pumps, a second volumetric fluid flow rate $R_2$ through the air permeable partition 37 to the secondary filter output port 38. Additionally, the secondary pump 50 has a characteristic pumping capacity capable of generating, in combination with the primary pump 40, a third volumetric fluid flow rate $R_3$ through the fuel vapor ducts 34 to the primary filter output port 36.

Fuel storage systems employing vapor return hardware are characterized by an average net fluid volume return rate which is the difference between the volume of vapor returned to the storage tanks of the system and the volume of fluid dispensed to a fuel receiving tank or lost to the ambient. The second volumetric fluid flow rate $R_2$ is selected such that it is greater than a characteristic average net fluid volume return rate of the fuel storage and dispensing system 10 to ensure that harmful pollutants are not vented to the ambient due to over pressurization, and to ensure that the filter system 16 of the present invention operates at maximum efficiency. For example, in a typical fuel storage system utilized to dispense on the order of 250,000 gallons of fuel per month, the second volumetric fluid flow rate $R_2$ is approximately 40 standard cubic feet per hour. Further, the first volumetric fluid flow rate $R_1$ is preferably approximately two to eight times the value of the second volumetric fluid flow rate $R_2$. The specific value of the selected second volumetric fluid flow rate $R_2$ is largely dependent upon the average fuel dispensing rate of the particular fuel storage system, however, it is contemplated by the present invention that, in many preferred embodiments of the present invention, the second volumetric fluid flow rate $R_2$ is between approximately 15 standard cubic feet per hour and approximately 150 standard cubic feet per hour.

The characteristics of the filter system 16 of the present invention allow the secondary pump 50 to be designed to create a pressure drop of about 50 kPa across the air-permeable partition 37. In some embodiments of the present invention, it is contemplated that the secondary pump 50 may be designed to create a pressure drop of between approximately 25 kPa and approximately 75 kPa or, more preferably, between approximately 37.5 kPa and approximately 62.5 kPa across the air-permeable partition 37. All of these values represent a significant departure from the storage system of U.S. Pat. No. 5,571,310, where harmful VOC from a storage system, as opposed to non-polluting air components from the storage system, are drawn through a membrane by using a vacuum pump to create a pressure drop of about one atmosphere (100 kPa) across the membrane.

The discussion herein of the embodiment of FIG. 8 describes the introduction of addition secondary pumps 50',50". Regardless of the number of additional secondary pumps provided in the fuel storage and dispensing system 10, there are specific advantages to ensuring that secondary pump or pumps 50 are designed not only to prevent over pressurization of the fuel storage and dispensing system 10 but also to ensure that the system 10 may be maintained below atmospheric pressure.

Vapor recovery systems commonly employ critical vapor return passageways to further enhance vapor recovery. Pressure drops within these passageways must be limited to ensure proper performance. The present invention is well-suited for ensuring proper vapor recovery because diagnostic information representative of pressure within the fuel storage and dispensing system 10 may be used to monitor pressure drop within the vapor return passageway of a vapor recovery system.

Operation of the fuel storage and dispensing system 10 of the present invention below atmospheric pressure is also advantageous because it provides a source of diagnostic information. Specifically, fugitive emissions and leaks may be detected by monitoring pressure at one or more of a number of diagnostic points within the system 10. For example, a variation in system pressure would be detected if storage tank supply lines, couplings, or fuel inlet ports 17 where not properly sealed after a tank filling operation. Variations in system pressure could also be detected if any cracks, fissures, or other defects in the fuel storage and dispensing system 10 were present.

The pressure data may be compared to system run time and other operational data to provide a complete diagnostic picture of the fuel storage and dispensing system 10. The system run time and other operational data may be correlated with the pressure data to provide a system profile that may, in turn, be used to verify primary liquid leak detection equipment or to audit system performance. For example, during system down time or times of relatively low activity, the filter system 16 of the present invention may be employed to pull a vacuum within the fuel storage and dispensing system 10 and subsequent pressure decay data maybe compared to previously measured or industry standard vacuum decay characteristics to detect leaks or test existing leak detection equipment.

Figure 12:
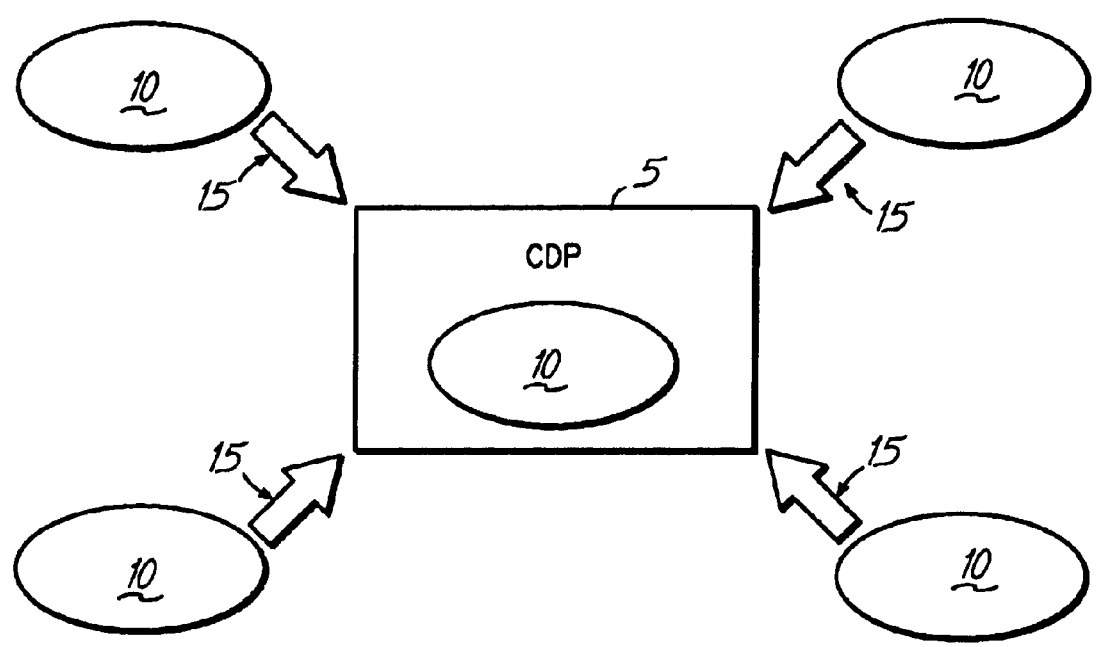
FIG. 12 is an illustration of a diagnostic component of a fuel storage and dispensing system according to the present invention.

Referring now to FIG. 12, pressure data may be transmitted from a pressure sensor in a fuel storage and dispensing system 10 to a data processor (CDP) 5 via a network, direct or indirect electrical links, optical links, RF links, or other types of communication links 15. The data processor 5 may be in communication with a local fuel storage and dispensing system 10, one or more remote fuel storage and dispensing systems 10, or both. In this manner, storage system data from one or more locations may be processed at a central location to diagnose system performance, generate a system profiles, and compare performance data of different systems. The storage system data may include pressure data sensed by the pressure sensors, fuel dispensing data, chronological data, and identification data.

The fuel storage and dispensing system 10 of the present invention may also be used for pro-active diagnostics by employing the primary and/or secondary pumps 40,50 to maintain the fuel storage and dispensing system 10 below atmospheric pressure. Global system data may then be monitored while a preferred degree of vacuum is maintained. Specifically, the data processor 5 may include a system data monitor in communication with a variety of data sensors (not shown) including, but not limited to, hydrocarbon emission sensors, volumetric flow meters, volumetric fuel dispensing meters, pressure sensors, etc. In this manner, the data processor 5 may be configured to track vent emissions (exhaust volume, % hydrocarbon emissions, etc.), dispensed fuel volume, vacuum level, leak detection data, etc., to create a global operating system profile. The global system profile may be compared with historical operating system profiles to evaluate system performance. The global operating system profile may also be analyzed to determine if system leaks or other operating problems are present and may be used to calibrate or validate existing leak detection equipment.

Referring now specifically to FIG. 8, in a further embodiment of the present invention, additional secondary pumps 50',50" are employed in the filter system 16 of the present invention. As will be appreciated by those practicing the present invention, the first filter assembly 30, the primary pump 40, and the secondary pump 50, are substantially as described above. However, in the embodiment illustrated in FIG. 8, the fuel storage and dispensing system 10 comprises two additional filter assemblies 30',30" connected in series such that: (i) the secondary pump 30 has a characteristic pumping capacity capable of generating a second volumetric fluid flow rate $R_2'$ through the air permeable partition 37 to the secondary filter output port 38, and capable of generating, in combination with the primary pump 40, a third volumetric fluid flow rate $R_3'$ through the primary filter output port 36; (ii) the first additional secondary pump 50' has a characteristic pumping capacity capable of generating a fourth volumetric fluid flow rate $R_4'$ through an additional air permeable partition 37 to an additional secondary filter output port 38', and capable of generating, in combination with the secondary pump 50, a fifth volumetric fluid flow rate $R_5'$ through an additional primary filter output port 36'; (iii) the second additional secondary pump 50" has a characteristic pumping capacity capable of generating a sixth volumetric fluid flow rate $R_6'$ through a second additional air permeable partition 37 to a second additional secondary filter output port 38" coupled to the air exhaust port 14, and capable of generating, in combination with the additional secondary pump 50', a seventh volumetric fluid flow rate $R_7'$ through a second additional primary filter output port 36"; and such that (iv) the sixth volumetric fluid flow rate $R_6'$ is greater than a characteristic average net fluid volume return rate of the fuel storage and dispensing system 10. To maximize system efficiency, the volumetric fluid flow rate through the air exhaust port 14 is approximately two to five times greater than the characteristic average net fluid volume return rate, or at least two times greater than the characteristic average net fluid volume return rate.

An additional filter input port 32' is coupled to the secondary filter output port 38 and a second additional filter input port 32" is coupled to the additional secondary filter output port 38'. An additional primary filter output port 36' and a second additional primary filter output port 36" are coupled to the pollutant return port 22. Referring to FIG. 8, the preferred flow rates (R) and associated hydrocarbon concentrations (HC) for one embodiment of the present invention are as follows, where $HC_6$ represents the hydrocarbon concentration of the fluid vented to the atmosphere:

| Flow Rate standard cubic feet per hour (scfh) | Hydrocarbon Concentration % of fluid flow |
|---|---|
| $R_1$ = 320 scfh | $HC_1$ = 80% |
| $R_2$ = 160 scfh | $HC_2$ = 59.93% |
| $R_3$ = 160 scfh | $HC_3$ = 99.998% |
| $R_4$ = 80 scfh | $HC_4$ = 25.54% |

-continued

| Flow Rate standard cubic feet per hour (scfh) | Hydrocarbon Concentration % of fluid flow |
|---|---|
| $R_5$ = 80 scfh | $HC_5$ = 95.01% |
| $R_6$ = 40 scfh | $HC_6$ = 1.54% |
| $R_7$ = 40 scfh | $HC_7$ = 47.61% |

Because the hydrocarbon concentration of the fluid vented to the atmosphere $HC_6$ is on the order of about 1%, it is possible to eliminate volatile organic compound emissions entirely by installing a microwave unit 60 proximate the air exhaust port 14. The microwave unit 60 is tuned to break down any remaining VOC in the exhaust stream.

In the embodiment illustrated in FIG. 8, the volumetric fluid flow rate through the air exhaust port 14 is selected such that it is greater than a characteristic average net fluid volume return rate of the fuel storage and dispensing system 10 to ensure that harmful pollutants are not vented to the ambient due to over pressurization, and to ensure that the filter system 16 of the present invention operates at maximum efficiency. The specific value of the selected second volumetric fluid flow rate $R_2$ is largely dependent upon the average fuel dispensing rate of the particular fuel storage system, however, it is contemplated by the present invention that, in many preferred embodiments of the present invention, the volumetric fluid flow rate through the air exhaust port 14 is between approximately 15 standard cubic feet per hour and approximately 150 standard cubic feet per hour, or, more specifically, 40 standard cubic feet per hour.

It is contemplated by the present invention that, if only one additional filter assembly 30' is utilized according to the present invention, the primary filter pump 40, the secondary filter pump 50, and the additional secondary pump 50' are preferably characterized by respective pumping capacities capable of generating a volumetric fluid flow rate through the air exhaust port 14 greater than the characteristic average net fluid volume return rate of the system 10.

The characteristics of the filter system 16 of the present invention allow the additional secondary pumps 50',50" to be designed to create a pressure drop of about 50 kPa across the respective air-permeable partitions 37. In some embodiments of the present invention, it is contemplated that the additional secondary pumps 50',50" may be designed to create a pressure drop of between approximately 25 kPa and approximately 75 kPa or, more preferably, between approximately 37.5 kPa and approximately 62.5 kPa across the respective air-permeable partitions 37.

While the invention has been described with reference to certain embodiments, it should be understood that numerous changes could be made within the spirit and scope on the inventive concepts described. Accordingly, it is intended that the invention not be limited to the disclosed embodiments, but that it have the full scope permitted by the language of the following claims.

What is claimed is:

1. A fuel storage and dispensing system comprising:
   at least one storage tank including at least one fluid vent port and at least one pollutant return port;
   an air exhaust port;
   at least one fuel dispenser, at least one fuel delivery port, and at least one vapor return port, wherein said fuel delivery port and said vapor return port are configured to couple said storage tank to said fuel dispenser, and wherein said fuel dispenser further comprises a vapor assist hose defining a fuel dispensing passage and a vapor recovery passage, wherein said vapor assist hose extends from a fuel input end to a fuel dispensing end, a meter configured to provide an indication of an amount of fuel dispensed through said vapor assist hose, and a dispenser coupling configured to place said fuel dispensing passage in communication with said fuel delivery port, and said vapor recovery passage in communication with said vapor return port;

a fuel dispensing nozzle defining a hose attachment end and a spout attachment end, wherein said hose attachment end is coupled with said fuel dispensing end of said vapor assist hose, said spout attachment end further defines a vapor return opening, and said vapor recovery passage of said vapor assist hose is in communication with said vapor return opening;

a rigid, fuel dispensing spout coupled to said spout attachment end of said fuel dispensing nozzle, wherein said fuel dispensing passage of said vapor assist hose is in communication with said rigid, fuel dispensing spout, and said rigid, fuel dispensing spout further defines a non-axial fuel tube;

a boot defining a proximal end and a distal end, wherein said proximal end is coupled to said spout attachment end of said fuel dispensing nozzle and said distal end is configured for communication with a surface proximate a fuel tank inlet pipe of a vehicle during fueling, said boot is positioned surrounding said rigid, fuel dispensing spout and defines an annular passage, said annular passage is configured for receiving fuel vapor displaced from said fuel inlet pipe of said vehicle during fueling and, said annular passage is in communication with said vapor return opening in said spout attachment end of said fuel dispensing nozzle;

a pressure relief chamber in communication with said fuel dispensing passage of said vapor assist hose, wherein said pressure relief chamber comprises a bleed hole and a fluid volume sufficient to enable fuel traveling within said fuel dispensing passage of said vapor assist hose to create a pressure relief vacuum within said chamber and, wherein said pressure relief vacuum has a magnitude sufficient to compensate for high temperature pressure build-up in said vapor assist hose;

a filter system comprising a filter input port coupled to said fluid vent port; and at least one pump configured to cause fluid to pass through said filter input port, wherein said storage tank, said filter system, and said pump are configured such that said storage tank and additional portions of said fuel storage and dispensing system operate below atmospheric pressure.

2. The fuel storage and dispensing system of claim 1 wherein said non-coaxial fuel tube is configured to be substantially dripless.

3. The fuel storage and dispensing system of claim 1 wherein said vapor return opening defined by said spout attachment end of said fuel dispensing nozzle is positioned about an outer periphery of said rigid, fuel dispensing spout.

4. The fuel storage and dispensing system of claim 1 wherein said rigid, fuel dispensing spout further comprises mounting hardware, wherein said mounting hardware has an outer boundary and, wherein said mounting hardware is configured to attach said rigid, fuel dispensing spout to said spout attachment end of said fuel dispensing nozzle.

5. The fuel storage and dispensing system of claim 4 wherein said vapor return opening is positioned outside of said outer boundary of said mounting hardware on said spout attachment end of said fuel dispensing nozzle.

6. The fuel storage and dispensing system of claim 1 further comprising at least one pressure sensor, wherein said pressure sensor is configured to monitor pressure at one or more diagnostic points within said fuel storage and dispensing system and, wherein said pressure sensor is configured to provide an indication of pressure.

7. The fuel storage and dispensing system of claim 6 wherein said indication of pressure is greater than, less than, or equal to atmospheric pressure.

8. The fuel storage and dispensing system of claim 6 wherein said pressure sensor is configured to provide an indication of pressure within or at one or more of said storage tank, said fluid vent port, said pollutant return port, said air exhaust port, said fuel dispenser, said vapor return port, said vapor assist hose, said vapor recovery passage, said dispenser coupling, said fuel dispensing nozzle, said pressure relief chamber, said vapor return opening, said boot, said filter system, and said pump.

9. The fuel storage and dispensing system of claim 6 wherein said pressure sensor is coupled to a dispenser display and, wherein said dispenser display is configured to provide an indication of pressure.

10. The fuel storage and dispensing system of claim 6 further comprising a data processor, wherein said data processor is coupled to said pressure sensor, wherein said data processor is configured to process pressure measurements received from said pressure sensor and, wherein said data processor is configured to generate a pressure data profile of said fuel storage and dispensing system.

11. The fuel storage and dispensing system of claim 10 wherein said data processor is further configured to generate a leak alarm when pressure monitored at one of said one or more diagnostic points exceeds a predetermined level.

12. The fuel storage and dispensing system of claim 11 wherein said data processor is further configured to correlate a position of a selected diagnostic point with said pressure monitored exceeding a predetermined level.

13. The fuel storage and dispensing system of claim 10 wherein said data processor is further configured to generate a vapor return port blockage signal when pressure monitored at said vapor return port exceeds a predetermined level.

14. The fuel storage and dispensing system of claim 6 further comprising a wireless transmitter in communication with said pressure sensor, wherein said wireless transmitter is configured to transmit a signal indicative of pressure.

15. The fuel storage and dispensing system of claim 1 further comprising a microwave unit arranged to direct microwave radiation at fluid released through said air exhaust port.

* * * * *

UNITED STATES PATENT AND TRADEMARK OFFICE
CERTIFICATE OF CORRECTION

PATENT NO. : 6,835,223 B2
DATED : December 28, 2004
INVENTOR(S) : Glenn K. Walker, Rodger P. Grantham and Ken Allen It is certified that error appears in the above-identified patent and that said Letters Patent is hereby corrected as shown below:

Column 9,
Line 63, "drained for from" should read -- drained from --.

Column 14,
Line 38, "data maybe" should read -- data may be --.

Column 17,
Lines 25-26, "non-axial" should read -- non-coaxial --.

Signed and Sealed this

Twenty-fourth Day of May, 2005

JON W. DUDAS
*Director of the United States Patent and Trademark Office*